(12) United States Patent
Sato et al.

(10) Patent No.: US 9,057,813 B2
(45) Date of Patent: Jun. 16, 2015

(54) OPTICAL FIBER

(71) Applicant: FUJIKURA LTD., Koto-ku, Tokyo (JP)

(72) Inventors: Mamoru Sato, Sakura (JP); Shoichiro Matsuo, Sakura (JP)

(73) Assignee: FUJIKURA LTD., Tokyo (JP)

( * ) Notice: Subject to any disclaimer, the term of this patent is extended or adjusted under 35 U.S.C. 154(b) by 235 days.

(21) Appl. No.: 13/912,584

(22) Filed: Jun. 7, 2013

(65) Prior Publication Data

US 2013/0272668 A1 Oct. 17, 2013

Related U.S. Application Data

(63) Continuation of application No. PCT/JP2012/067114, filed on Jul. 4, 2012.

(30) Foreign Application Priority Data

Jul. 4, 2011 (JP) .................................. 2011-148228
Apr. 27, 2012 (JP) .................................. 2012-102719

(51) Int. Cl.
*G02B 6/02* (2006.01)
*G02B 6/036* (2006.01)

(52) U.S. Cl.
CPC .............. *G02B 6/02* (2013.01); *G02B 6/03688* (2013.01); *G02B 6/02266* (2013.01); *G02B 6/03683* (2013.01)

(58) Field of Classification Search
CPC ............ G02B 6/03683; G02B 6/03661; G02B 6/0365; G02B 6/03688
See application file for complete search history.

(56) References Cited

U.S. PATENT DOCUMENTS 7,164,835 B2 * 1/2007 Matsuo et al. ................. 385/127
8,081,854 B2 * 12/2011 Yoon et al. .................... 385/124

(Continued)

FOREIGN PATENT DOCUMENTS

CN 101770051 A 7/2010
CN 102047157 A 5/2011

(Continued)

OTHER PUBLICATIONS

International Search Report from the International Searching Authority dated Oct. 9, 2012 in counterpart application No. PCT/JP2012/067114.

(Continued)

*Primary Examiner* — Rhonda Peace
(74) *Attorney, Agent, or Firm* — Sughrue Mion, PLLC

(57) ABSTRACT

An optical fiber of the invention satisfies $\Delta_{core} > \Delta_{ic} > \Delta_{tmax} > \Delta_{tmin}$, $-0.15\% \geq \Delta_{tmax} > \Delta_{tmin} \geq -0.7\%$, and $0.45 \leq (r_{tmax} - r_{in})/(r_{out} - r_{in}) \leq 0.9$ where the relative refractive index difference of the core is $\Delta_{core}$, the relative refractive index difference of the internal cladding coat is $\Delta_{ic}$, the relative refractive index difference of a highest refractive index layer in the trench coating is $\Delta_{tmax}$, the relative refractive index difference of a lowest refractive index layer in the trench coating is $\Delta_{tmin}$, the radius of an internal edge of the trench coating is $r_{in}$, the radius of an external edge of the trench coating is $r_{out}$, and the radius of an internal edge of a highest refractive index layer in the trench coating is $r_{tmax}$ and where the relative refractive index differences are based on a refractive index of the outermost cladding coat.

6 Claims, 13 Drawing Sheets

(56) References Cited

U.S. PATENT DOCUMENTS

| | | | |
|---|---|---|---|
| 8,107,784 B2 * | 1/2012 | Borel et al. | 385/127 |
| 8,385,701 B2 * | 2/2013 | Bookbinder et al. | 385/123 |
| 8,538,219 B2 * | 9/2013 | Bickham et al. | 385/126 |
| 8,718,431 B2 * | 5/2014 | Peckham et al. | 385/127 |
| 2006/0039665 A1 | 2/2006 | Matsuo et al. | |
| 2006/0045448 A1 | 3/2006 | Nakajima et al. | |
| 2006/0263019 A1 | 11/2006 | Negishi et al. | |
| 2007/0147756 A1 | 6/2007 | Matsuo et al. | |
| 2007/0280615 A1 | 12/2007 | de Montmorillon et al. | |
| 2009/0060437 A1 | 3/2009 | Fini et al. | |
| 2009/0290841 A1 | 11/2009 | Borel et al. | |
| 2010/0021117 A1 | 1/2010 | de Montmorillon et al. | |
| 2010/0158460 A1 | 6/2010 | Yoon et al. | |
| 2011/0064368 A1 * | 3/2011 | Bookbinder et al. | 385/123 |
| 2011/0164852 A1 | 7/2011 | de Montmorillon et al. | |
| 2012/0106909 A1 * | 5/2012 | Bickham et al. | 385/124 |
| 2013/0071079 A1 * | 3/2013 | Peckham et al. | 385/124 |
| 2013/0272668 A1 * | 10/2013 | Sato et al. | 385/123 |
| 2014/0185996 A1 * | 7/2014 | Zhang et al. | 385/124 |

FOREIGN PATENT DOCUMENTS

| | | | |
|---|---|---|---|
| EP | 0260795 | A2 | 3/1988 |
| JP | 63-43107 | A | 2/1988 |
| JP | 2006-309034 | A | 11/2006 |
| JP | 2007-279739 | A | 10/2007 |
| JP | 2008-310328 | A | 12/2008 |
| JP | 2009-8850 | A | 1/2009 |
| JP | 2009-543126 | A | 12/2009 |
| JP | 2010-503018 | A | 1/2010 |
| JP | 2010-503019 | A | 1/2010 |
| JP | 2010-181641 | A | 8/2010 |
| JP | 2011-107672 | A | 6/2011 |
| KR | 10-2010-0071901 | A | 6/2010 |
| WO | 99/67178 | A1 | 12/1999 |
| WO | 2004/092793 | A1 | 10/2004 |
| WO | 2004/092794 | A1 | 10/2004 |
| WO | 2006/025231 | A1 | 3/2006 |
| WO | 2008/005233 | A2 | 1/2008 |
| WO | 2008/027336 | A1 | 3/2008 |
| WO | 2008/027351 | A2 | 3/2008 |

OTHER PUBLICATIONS

Communication dated Dec. 4, 2014 from the European Patent Office in counterpart application No. 12806985.3.

Montmorillon et al, "Recent Developments of Bend-insensitive and Ultra-bend-insensitive Fibers Fully Compliant with Both G.657.B and G.652.D ITU-T Recommendations," Proceedings of the 58th IWCS/IICIT, International Wire & Cable Symposium, 2009, pp. 270-276(7 pages total).

Communication dated Feb. 4, 2015 from the State Intellectual Property Office of the People's Republic of China in counterpart application No. 201280004025.8.

Communication dated May 7, 2014 from the Japanese Patent Office in counterpart application No. 2013-503311.

Machine Translation of JP 2011-107672 of record.
Machine Translation of JP 2010-181641 of record.
Machine Translation of JP 2008-310328 of record.
Machine Translation of JP 2009-008850 of record.
Machine Translation of JP 2007-279739 of record.

* cited by examiner

OPTICAL FIBER

CROSS REFERENCE TO RELATED APPLICATIONS

This application is a continuation application based on a PCT Patent Application No. PCT/JP2012/067114, filed Jul. 4, 2012, whose priority is claimed on Japanese Patent Application No. 2011-148228 filed on Jul. 4, 2011, and Japanese Patent Application No. 2012-102719 filed on Apr. 27, 2012, the entire content of which are hereby incorporated by reference.

BACKGROUND OF THE INVENTION

1. Field of the Invention

The present invention relates to an optical fiber having the low-bending loss equal to that of a conventional trench structure at low cost.

2. Description of the Related Art

FTTH (Fiber To The Home) is in widespread use, accordingly, optical fibers have been installed indoors such as in buildings, households, and the like, and an optical fiber having reduced bending loss has been attracting attention.

By use of a bending loss insensitive fiber, the effect of preventing signals from being instantaneously interrupted due to loss generated by bending optical fibers, or the effect of reducing the laying cost due to easy handling of the optical fibers is expected.

There is a trade-off relationship between a mode field diameter (MFD) and bending loss in an optical fiber having a simple core-cladding structure which is used for a conventional single-mode optical fiber (S-SMF), it is possible to reduce the bending loss by reducing the MFD.

However, there is a problem in that the reduction of the MFD causes an increase in connection loss of S-SMF thereto or deviates from the range of the MFD determined by the international recommendation ITU-T G.652 related to a single-mode optical fiber (SMF) (the design criterion value at a wavelength of 1310 nm is a MFD of 8.6 to 9.5 µm), and there is a limitation in reducing the bending loss due to the reduction of the MFD.

As a technique of reducing the bending loss without reducing the MFD, a refractive index profile which is referred to as trench type is known (refer to Japanese Unexamined Patent Application, First Publication No. S63-43107).

Additionally, as a bending loss insensitive fiber, a number of methods using the trench-type refractive index profile has been proposed.

For example, PCT International Publication No. WO 2004/092794 discloses that the trench-type refractive index profile is not applied to a dispersion shifted optical fiber (DSF) disclosed in Japanese Unexamined Patent Application, First Publication No. S63-43107 but applied to a conventional SMF.

PCT International Publication No. WO 2006/025231 discloses a structure reducing the MFD and reducing the bending loss in addition to making the wavelength dispersion characteristics thereof to be the region similar to a normal SMF.

Published Japanese Translation No. 2010-503018 of PCT International Publication discloses a structure improving the reduction of the bending loss by making the relative refractive index difference of the trench region to be an extremely low value such as −0.63% or less.

Published Japanese Translation No. 2010-503019 of PCT International Publication discloses an optical fiber having a fiber cut-off wavelength less than 1260 nm and a zero-dispersion wavelength which is in the range of 1300 to 1324 nm and having reduced bending loss in the diameter of 10 mm.

As for shortening a manufacturing time of a trench optical fiber and designing for reducing the cost, a method of reducing a distance between a core and a trench is disclosed in Japanese Unexamined Patent Application, First Publication No. 2009-8850.

Japanese Unexamined Patent Application, First Publication No. 2007-279739 discloses a method of realizing both bending loss and single-mode transmission by providing an intermediate cladding coat and a low-refractive index layer outside of a trench coating.

Furthermore, a method is known which obtains the same effect as that of the trench-type by use of a constitution having air space at a part of a cladding coat (for example, refer to PCT International Publication No. WO 2004/092793 and Published Japanese Translation No. 2009-543126 of PCT International Publication).

In addition, as alternative approaches, a method is disclosed which releases the limitation of a cut-off wavelength by making the loss of a higher order mode increase, and obtaining a bending loss insensitive fiber (for example, refer to Japanese Unexamined Patent Application, First Publication No. 2008-310328).

Moreover, Louis-Anne de Montmorillon, et al, "Recent Developments of Bend-insensitive and Ultra-bend-insensitive Fibers Fully Compliant with Both G.657.B and G.652.D ITU-T Recommendations", Proceedings of the 58th IWCS/IICIT, International Wire & Cable Symposium, 2009, pp. 270-276 discloses an example related to behavior of a higher order mode in a trench optical fiber.

However, connection is an issue in a structure having a hole such as a hole-assisted fiber (HAF), Clear Curve (registered trademark), or the like, as compared with an optical fiber having a solid glass structure which does not have a hole such as a trench optical fiber.

For example, since accurate core alignment is required for a fusion splice, many fusion splicers use a direct core observation method which detects and aligns a core by analyzing an observed image of a side face of an optical fiber.

However, in a case where a hole is present in a cladding, since it is impossible to detect the position of the core by use of the image of the side face, an outer diameter alignment method with reference to the cladding diameter should be used.

Since the outer diameter alignment method is influenced by eccentricity of the core with respect to the circumscribed circle of the cladding, there is a problem in that connection loss easily increases as compared with a direct core observation method.

Additionally, the structure of the optical fiber disclosed in Japanese Unexamined Patent Application, First Publication No. 2008-310328 is extremely complicated, and an advanced manufacturing technique is necessary; furthermore, since a layer having a low refractive index is provided at the region which is wider than that of a trench structure, a large amount in dopants making a refractive index low is necessary, and there is a problem in terms of the cost of manufacturing.

Even in a case of the conventional trench structure, when the relative refractive index difference of the trench is set low such as to be approximately −0.7% or −0.5%, as exemplified in Published Japanese Translation No. 2010-503018 of PCT International Publication and Published Japanese Translation No. 2010-503019 of PCT International Publication, a large amount in dopants for forming a trench is necessary, and there is problem of an increase in the cost of manufacturing.

Although the optical fiber having a trench structure can be manufactured by a variety of manufacturing methods, suppression of the material cost for forming a trench coating is an issue depending on manufacturing methods.

FIG. 3 shows an example of the relationship between a partial pressure of silicon tetrafluoride ($SiF_4$) in the case of forming a trench coating by use of a MVCD method, and the relative refractive index difference of the resultant fluorine-doped silica glass.

The relative refractive index difference of the resultant glass shows that it is proportional to approximately fourth root of a partial pressure of $SiF_4$.

Consequently, in a structure which requires relative refractive index difference Δ such as less than −0.5%, the used amount of a source material gas of $SiF_4$ dramatically increases.

For example, in order to obtain the relative refractive index difference Δ of 0.5%, it is necessary to set approximately 20 times partial pressure of $SiF_4$ which is in the case of obtaining the relative refractive index difference Δ of −0.2%.

In Japanese Unexamined Patent Application, First Publication No. 2009-8850, a low-refractive index layer is designed so as to be close to a core in order to reduce the cost of materials; however, since a trench having a great negative relative refractive index difference should be provided in order to reduce bending loss, the effect for reducing the cost is limited.

Moreover, when the trench and the core are extremely close to each other, since optical characteristics such as chromatic dispersion or the like are separated from the international recommendation, there is a limitation to make the low-refractive index layer approach the core.

In contrast, there is a problem in that the loss of an optical fiber having a trench structure under a higher order mode is smaller than that of a conventional SMF.

The tendency shown as described above appears as difference in length dependence of a cut-off wavelength.

For example, Louis-Anne de Montmorillon, et al, "Recent Developments of Bend-insensitive and Ultra-bend-insensitive Fibers Fully Compliant with Both G.657.B and G.652.D ITU-T Recommendations", Proceedings of the 58th IWCS/IICIT, International Wire & Cable Symposium, 2009, pp. 270-276 discloses the behavior of a trench optical fiber under a higher order mode, wavelength-dependence in LP11 Leakage Loss is shown in FIG. 2 thereof.

When wavelengths are compared to each other on the line of 1 dB/m corresponding to the cable cut-off wavelength $\lambda_{c22m}$ of 22 m, the wavelengths of three optical fibers are distributed in the range of 1225 to 1260 nm, the optical fibers satisfying the cable cut-off wavelength less than 1260 nm defined by ITU-T or the like.

When losses are compared to each other in a wavelength of 1310 nm used for communication, the losses in optical fibers are approximately 2 to 12 dB/m.

Because of this, in the case of using an optical fiber having a short length such as several meters, the higher order mode does not sufficiently attenuate, and there is a possibility that communication is interrupted.

The foregoing behaviors are easily compared to each other when the difference between the cable cut-off wavelength $\lambda_{c22m}$ of 22 m and the fiber cut-off wavelength $\lambda_{c2m}$ of 2 m is represented as an indicator.

In the case of three optical fibers disclosed in Louis-Anne de Montmorillon, et al, "Recent Developments of Bend-insensitive and Ultra-bend-insensitive Fibers Fully Compliant with Both G.657.B and G.652.D ITU-T Recommendations", Proceedings of the 58th IWCS/IICIT, International Wire & Cable Symposium, 2009, pp. 270-276, the difference is 63 to 146 nm.

In the case of designing a trench optical fiber so as to improve bending loss when a diameter is small such as a bending radius of 5 mm, the difference $\lambda_{c2m}-\lambda_{c22m}$ has a tendency to be long.

For this reason, a desired structure has the equivalent bending property, and the difference in the cut-off thereof becomes low.

SUMMARY OF THE INVENTION

The invention was conceived in view of the above-described circumstances and has an object thereof to provide a bending loss insensitive which can be manufactured at a low cost.

In order to solve the above-described problem, an optical fiber of an aspect of the invention includes: a core provided at a central portion; an internal cladding coat provided around the core, having a refractive index less than a refractive index of the core; a trench coating provided at a periphery of the internal cladding coat and constituted of two or more layers having different refractive indices; and an outermost cladding coat provided at a periphery of the trench coating.

A layer having the highest refractive index in the trench coating configures an outermost layer of the trench coating.

The relationships of $\Delta_{core} > \Delta_{ic} > \Delta_{tmax} > \Delta_{tmin}$, $-0.15\% \geq \Delta_{tmax} > \Delta_{tmin} \geq -0.7\%$, and $0.45 \leq (r_{tmax}-r_{in})/(r_{out}-r_{in}) \leq 0.9$ are satisfied where a relative refractive index difference of the core is represented as $\Delta_{core}$, a relative refractive index difference of the internal cladding coat is represented as $\Delta_{ic}$, a relative refractive index difference of a layer having the highest refractive index in the trench coating is represented as $\Delta_{tmax}$, a relative refractive index difference of a layer having the lowest refractive index in the trench coating is represented as $\Delta_{tmin}$, a radius of an internal edge of the trench coating is represented as $r_{in}$, a radius of an external edge of the trench coating is represented as $r_{out}$, and a radius of an internal edge of a layer having the highest refractive index in the trench coating is represented as $r_{tmax}$ and where the relative refractive index differences are based on a refractive index of the outermost cladding coat.

In the optical fiber of the aspect of the invention, it is preferable that relationships $-0.40\% \geq \Delta_{tmin} \geq -0.50\%$ and $-0.15\% \geq \Delta_{tmax} \geq -0.25\%$ be satisfied in the trench coating.

In the optical fiber of the aspect of the invention, it is preferable that relationship $0.7 \leq (r_{tmax}-r_{in})/(r_{out}-r_{in}) \leq 0.9$ be satisfied in the trench coating.

In the optical fiber of the aspect of the invention, it is preferable that relationship $0.7 \leq (r_{tmax}-r_{in})/(r_{out}-r_{in}) \leq 0.8$ be satisfied in the trench coating.

In the optical fiber of the aspect of the invention, it is preferable that the layer having the lowest refractive index in the trench coating configure an innermost layer of the trench coating.

In the case where the trench coating is constituted of two layers having different refractive indexes, a low-refractive-index layer is disposed inside the trench coating and a high-refractive-index layer is disposed outside the trench coating.

In the case where the trench coating is constituted of three layers having different refractive indexes, a structure can be adopted in which a layer having the lowest refractive index in the trench coating is located at the innermost layer of the trench coating (the layer is close to the internal cladding coat).

In the optical fiber of the aspect of the invention, it is preferable that the outermost cladding coat be formed of pure silica glass and the trench coating be formed of silica glass into which fluorine is introduced.

Effects of the Invention

According to the invention, since the aforementioned requisite is satisfied, it is possible to obtain an optical fiber having a low-bending loss equal to that of a conventional trench structure at a low cost.

DETAILED DESCRIPTION OF THE INVENTION

Hereinafter, the invention will be described based on a preferred embodiment with reference to drawings.

Figure 1:
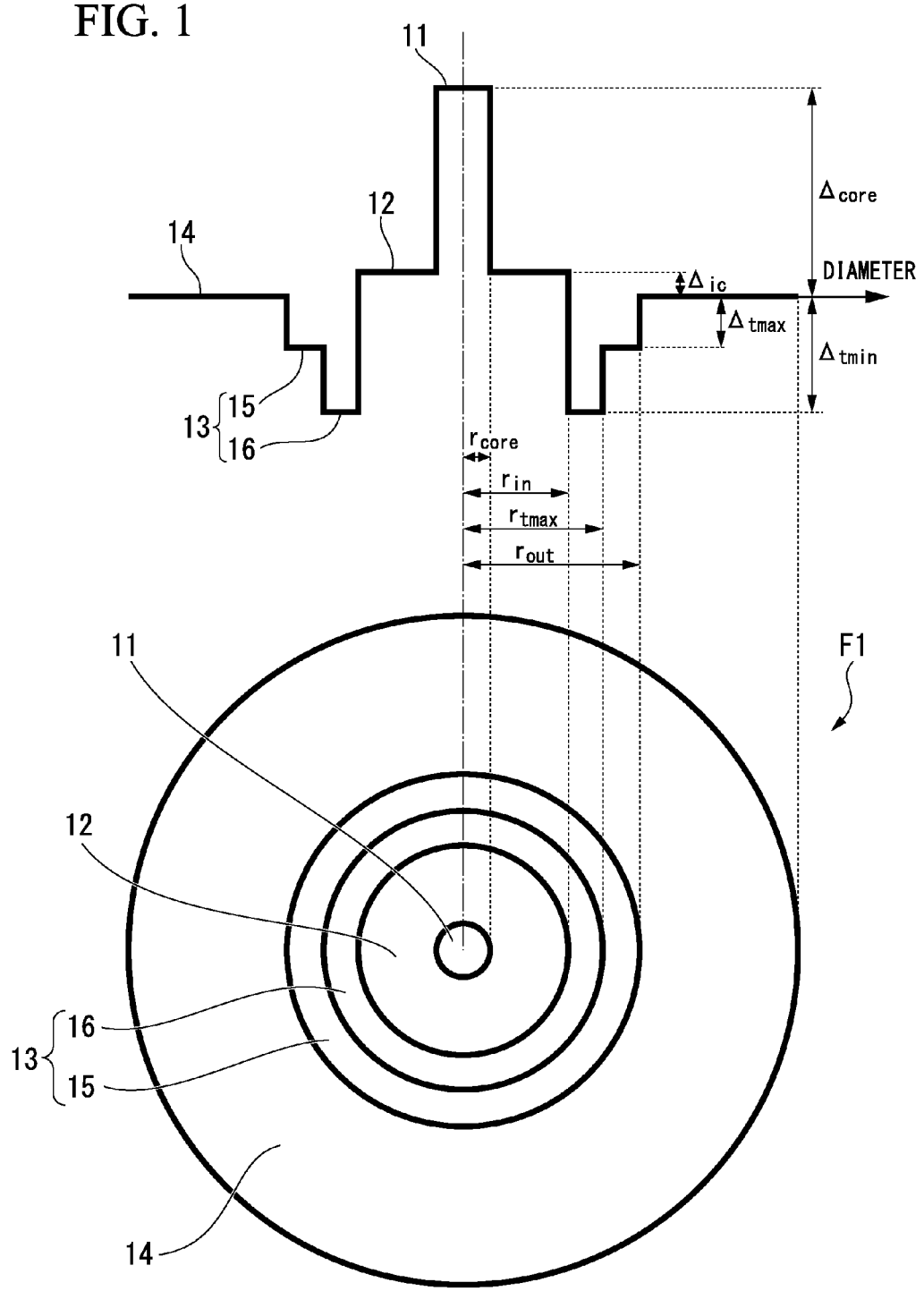
FIG. 1 is a view schematically showing a refractive index profile of an optical fiber related to a first embodiment.

FIG. 1 schematically shows a refractive index profile of an optical fiber related to a first embodiment of the invention.

The optical fiber F1 is provided with a core 11, an internal cladding coat 12, a trench coating 13, and an outermost cladding coat 14.

The core 11 is located at a central portion of the optical fiber F1.

The internal cladding coat 12 is located at the periphery of the core 11 and has a refractive index less than that of the core 11.

The trench coating 13 is located at the periphery of the internal cladding coat 12 and is constituted of two layers 15 and 16 (a first refractive index layer 15 and a second refractive index layer 16) having refractive indexes different from each other.

The outermost cladding coat 14 is located at the periphery of the trench coating 13.

Here, the first refractive index layer 15 (outermost layer) is a layer having the highest refractive index, and the second refractive index layer 16 is a layer having the lowest refractive index (innermost layer).

Figure 2:
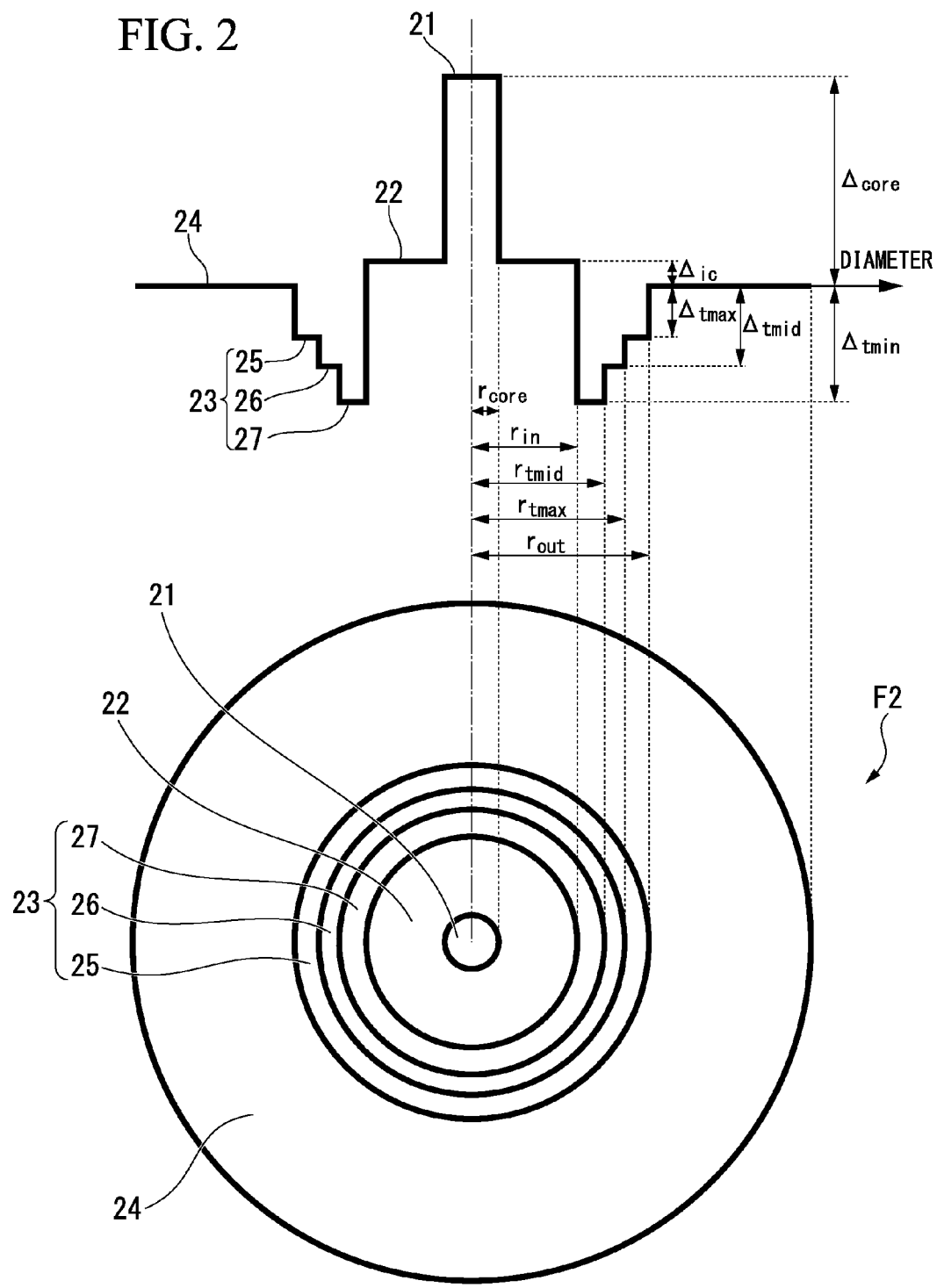
FIG. 2 is a view schematically showing a refractive index profile of an optical fiber related to a second embodiment.

In addition, FIG. 2 schematically shows a refractive index profile of an optical fiber related to a second embodiment of the invention.

The optical fiber F2 is provided with a core 21, an internal cladding coat 22, a trench coating 23, and an outermost cladding coat 24.

The core 21 is located at a central portion of the optical fiber F2.

The internal cladding coat 22 is located at the periphery of the core 21 and has the refractive index less than that of the core 21.

The trench coating 23 is located at the periphery of the internal cladding coat 22 and is constituted of three layers 25, 26, and 27 (a first refractive index layer 25, a second refractive index layer 27, and a third refractive index layer 26) having refractive indexes different from each other.

The outermost cladding coat 24 is located at the periphery of the trench coating 23.

Here, the first refractive index layer 25 is a layer having the highest refractive index (outermost layer), and the second refractive index layer 27 is a layer having the lowest refractive index (innermost layer).

The optical fibers of the above-described first and second embodiments have a relationship of $\Delta_{core} > \Delta_{ic} > \Delta_{tmax} > \Delta_{tmin}$ where the relative refractive indexes differences of the cores 11 and 21 are represented as $\Delta_{core}$, the relative refractive index differences of the internal cladding coats 12 and 22 are represented as $\Delta_{ic}$, the relative refractive index difference of the layer 15 having the highest refractive index in the trench coating 13 is represented as $\Delta_{tmax}$, the relative refractive index difference of the layer 25 having the highest refractive index in the trench coating 23 is represented as $\Delta_{tmax}$, the relative refractive index difference of the layer 16 having the lowest refractive index in the trench coating 13 is represented as $\Delta_{tmin}$, and the relative refractive index difference of the layer 27 having the lowest refractive index in the trench coating 23 is represented as $\Delta_{tmin}$, as the relative refractive index difference with reference to refractive indexes of the outermost cladding coats 14 and 24.

Here, $\Delta_{core} > \Delta_{ic}$ means that the internal cladding coats 12 and 22 have a refractive index less than that of the cores 11 and 21; and $\Delta_{ic} > \Delta_{tmax}$ means that each of the layers 15 and 16 included in the trench coating 13 has the refractive index less than that of the internal cladding coat 12 and each of the layers 25 to 27 included in the trench coating 23 has a refractive index less than that of the internal cladding coat 22.

Additionally, $\Delta_{tmax} > \Delta_{tmin}$ means that the trench coatings 13 and 23 are formed of a plurality of layers having refractive indexes different from each other.

The refractive index of the trench coating 13 is less than the refractive index of the outermost cladding coat 14.

Furthermore, the refractive index of the trench coating 23 is less than the refractive index of the outermost cladding coat 24.

Consequently, $\Delta_{tmax}$ and $\Delta_{tmin}$ are negative values.

It is desirable that the range of the relative refractive index differences of the trench coatings 13 and 23 be appropriately determined in consideration of various factors in optical characteristics such as a confinement effect in a fundamental mode, the amount of dopant, or the like, or the cost of manufacturing or the like; for example, it is preferable that the relative refractive index difference be in the range of −0.15% to −1.0%.

Particularly, it is preferable that the relative refractive index difference satisfy $-0.15\% \geq \Delta_{tmax} > \Delta_{tmin} \geq -0.7\%$.

The range of the relative refractive index difference $\Delta_{tmax}$ is preferably $-0.15\% \geq \Delta_{tmax} > -0.7\%$, and $-0.15\% \geq \Delta_{tmax} \geq -0.25\%$ is more preferable.

The range of the relative refractive index difference $\Delta_{tmax}$ is preferably $-0.15\% > \Delta_{tmax} \geq -0.7\%$, and $-0.3\% \geq \Delta_{tmin} \geq -0.7\%$ is more preferable.

The range of the difference in $\Delta_{tmax} - \Delta_{tmin}$ is preferably $0.55\% \geq \Delta_{tmax} - \Delta_{tmin} \geq 0.1\%$, and $0.35\% \geq \Delta_{tmax} - \Delta_{tmin} \geq -0.15\%$ is more preferable.

Furthermore, in the trench coating 13, the high-refractive-index layer 15 is provided at the outermost layer of the trench coating 13, and the layer 16 having a lower refractive index is provided inside the layer 15.

In the trench coating 23, the high-refractive-index layer 25 is provided at the outermost layer of the trench coating 3, and the layers 26 and 27 having lower refractive indexes are provided inside the layer 25.

Therefore, the difference in the refractive index with respect to the internal cladding coats 12 and 22 further increases, an electric field of a fundamental mode is confined by the trench coatings 13 and 23, and it is possible to realize reduction in bending loss.

Additionally, the amount of dopant such as fluorine F or the like, which makes a refractive index low, becomes greater in a low-refractive-index layer but becomes lower in a high-refractive-index layer.

Since the layers 15 and 25 having lowest amount of dopant is present as the outermost layer having the largest radius, the amount of dopant used for forming the trench coatings 13 and 23 is further reduced, and it is possible to reduce the cost of manufacturing.

In the case where the trench coating 23 is constituted of three layers or more such as the layers 25 to 27 as shown in FIG. 2, it is also possible to form the trench coating 23 so that the layer 27 having the lowest refractive index becomes the innermost layer of the trench coating 23.

As stated above, since the layer 27 having the greatest amount of dopant is present as the innermost layer the smallest radius, the amount of dopant used for forming the trench coating 23 is further reduced, and it is possible to enhance the effect of confining an electric field of a fundamental mode and reducing bending loss while reducing the cost of manufacturing.

It is preferable that the outermost cladding coats 14 and 24 be formed of pure silica glass and that the layers 15 and 16 constituting the trench coating 13 or the layers 25 to 27 constituting the trench coating 23 be formed of silica glass into which fluorine is introduced.

The cores 11 and 21 may be formed of silica glass, into which one, two, or more types of the dopant making a refractive index increase such as germanium Ge or the like is introduced.

The dopant, which increases the refractive index or reduces the refractive index, may be introduced into the internal cladding coats 12 and 22, or the internal cladding coats 12 and 22 may be formed of pure silica glass into which no dopant is introduced.

Each layer forming the refractive index profile may be formed by use of a publicly known method such as a modified chemical vapor deposition method, a plasma chemical vapor deposition method, a vapor-phase axial deposition method, or the like, or a method combining such methods.

For example, when the trench coating 13 is formed by a modified chemical vapor deposition method, a silica glass tube is used which corresponds to a portion adjacent to an external edge of the trench coating 13 in the outermost cladding coat 14.

Alternatively, when the trench coating 23 is formed by a modified chemical vapor deposition method, a silica glass tube is used which corresponds to a portion adjacent to an external edge of the trench coating 23 in the outermost cladding coat 24.

Furthermore, glass including a composition of the trench coatings 13 and 23 is deposited inside the glass tube by use of one, two, or more types of raw materials including Si and F.

At this time, by varying the used amount of the raw material including F, it is possible to form the trench coatings 13 and 23 which are constituted of two or more layers having different refractive indexes.

Furthermore, in the case of the modified chemical vapor deposition method, it is possible to form the internal cladding coat 12 and the core 11 inside the trench coating 13 in this order.

Alternatively, it is possible to form the internal cladding coat 22 and the core 21 inside the trench coating 23 in this order.

As a method for forming the cores 11 and 21, a separately-formed core serving as a core rod is inserted into the inside thereof, and the core may be integrated together with the above-described layer.

As a method for forming the outermost cladding coats 14 and 24, it is also possible to form the cladding coats 14 and 24 while depositing the cladding coat outside a starting glass tube by outside deposition so as to increase the external diameter until a necessary thickness thereof is obtained.

Since an optical fiber can be produced by fiber drawing of a optical fiber preform, the refractive index profile in the optical fiber preform has the profile which is enlarged similarly to the refractive index profile in the optical fiber.

It is preferable that the radius $r_{core}$ and the relative refractive index difference $\Delta_{core}$ of the cores 11 and 21 be appropriately determined in consideration of the relationship between the radius $r_{in}$ and the relative refractive index difference $\Delta_{ic}$ in the internal cladding coats 12 and 22 so that the MFD determined by the international recommendation becomes 8.6 to 9.5 μm or the approximate value thereof.

Where the radiuses of the internal edges of the trench coatings 13 and 23 are represented as $r_{in}$, the radiuses of the external edges of the trench coatings 13 and 23 are represented as $r_{out}$, and the radiuses of the internal edges of the layers 15 and 25 having the highest refractive index in the trench coatings 13 and 23 is represented as $r_{tmax}$, the ratio expressed by $(r_{tmax}-r_{in})/(r_{out}-r_{in})$ is preferably in the range of 0.7 to 0.9.

Figure 6:
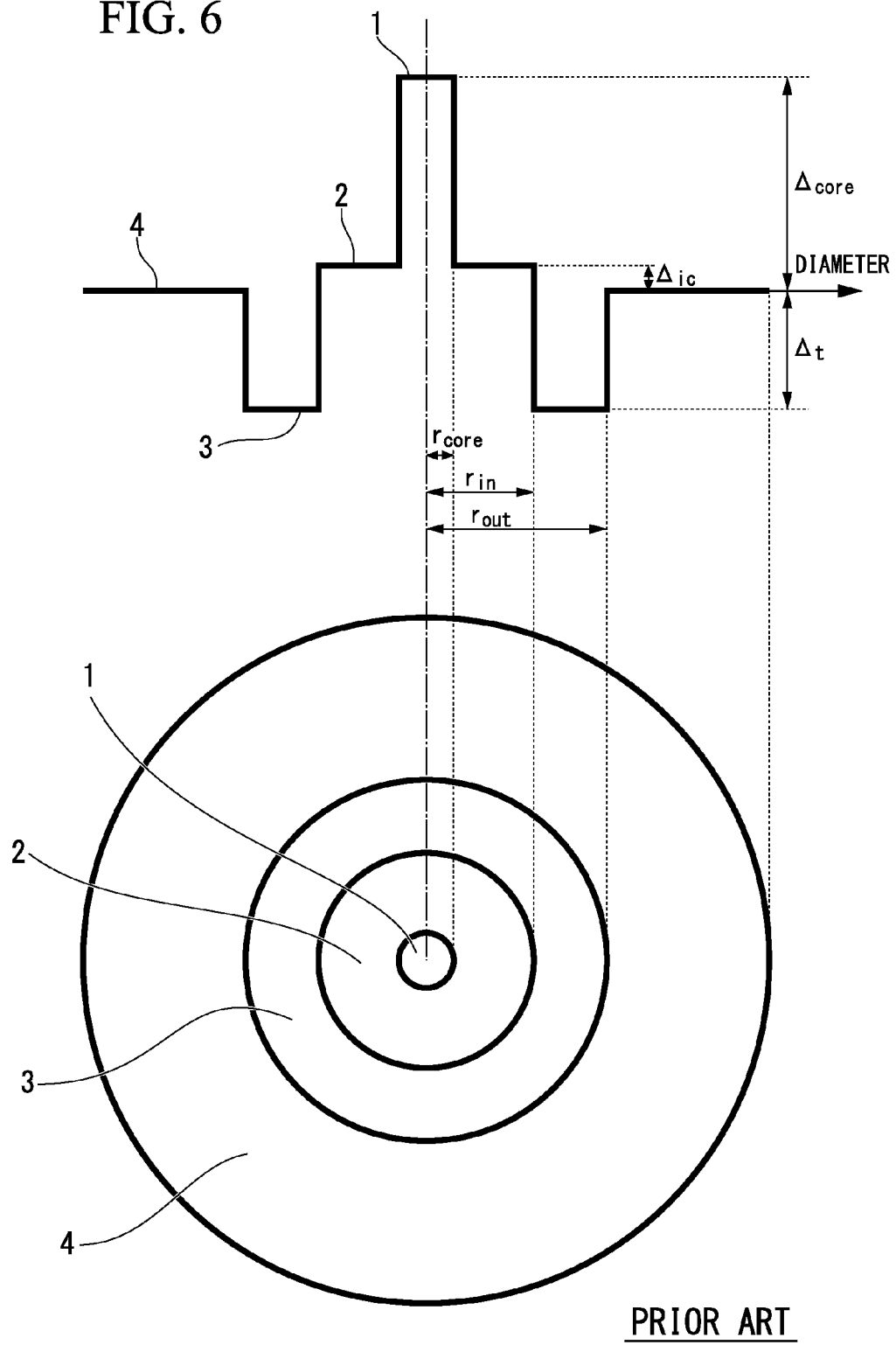
FIG. 6 is a view showing an example of a refractive index profile of a conventional trench optical fiber.
Figure 7:
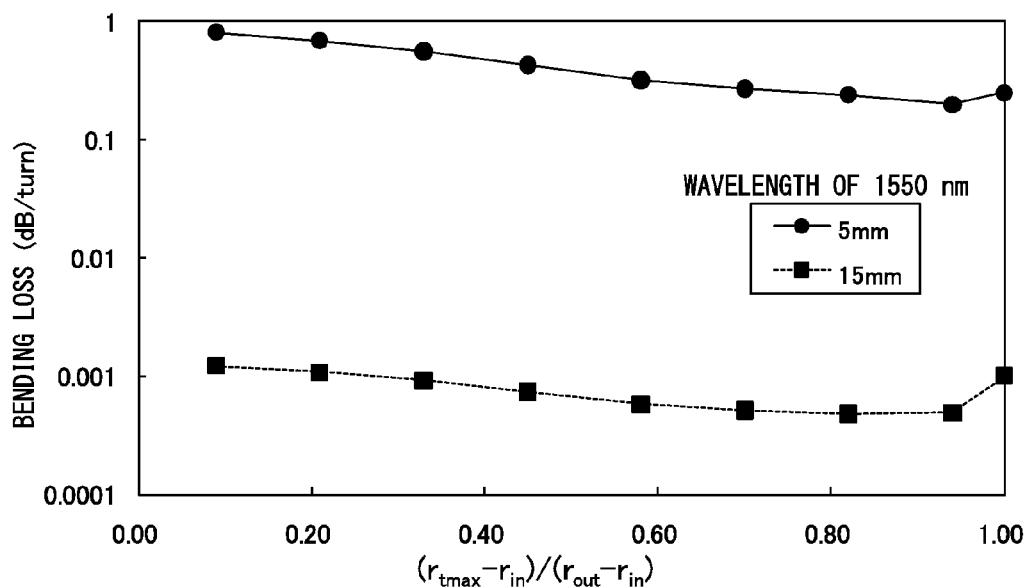
FIG. 7 is a graph on which bending losses in a wavelength of 1550 nm with respect to $(r_{tmax}-r_{in})/(r_{out}-r_{in})$ are plotted in Example 1.
Figure 8:
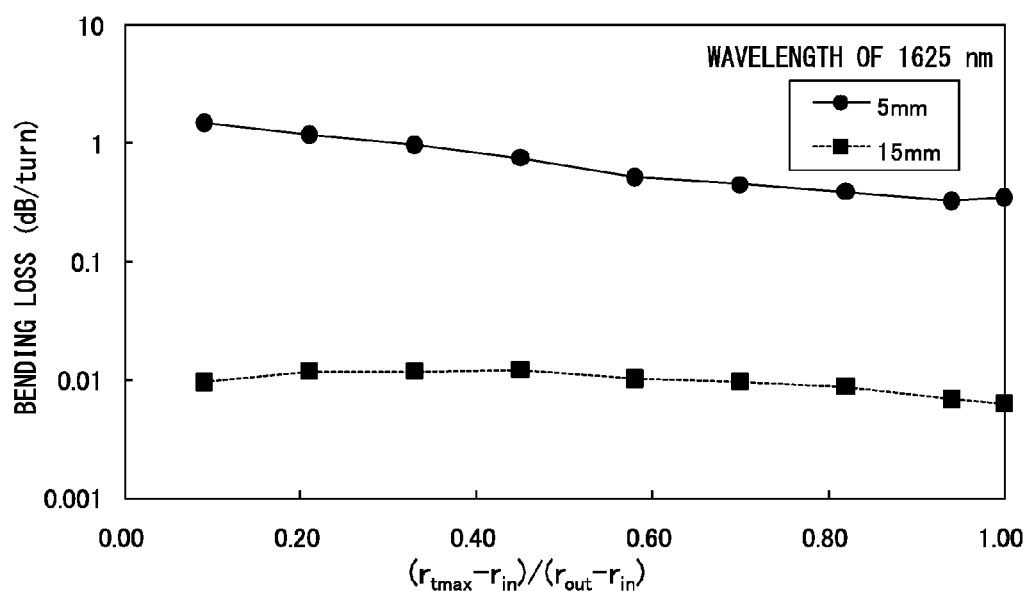
FIG. 8 is a graph on which bending losses in a wavelength of 1625 nm with respect to $(r_{tmax}-r_{in})/(r_{out}-r_{in})$ are plotted in Example 1.
Figure 9:
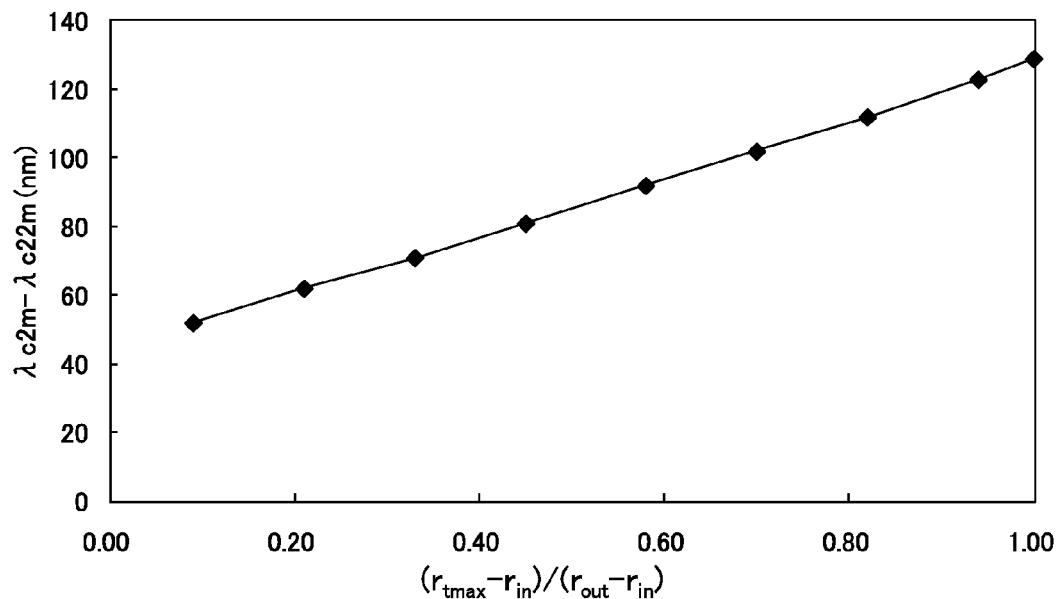
FIG. 9 is a graph on which $\lambda_{c2m}-\lambda_{c22m}$ with respect to $(r_{tmax}-r_{in})/(r_{out}-r_{in})$ are plotted in Example 1.
Figure 10:
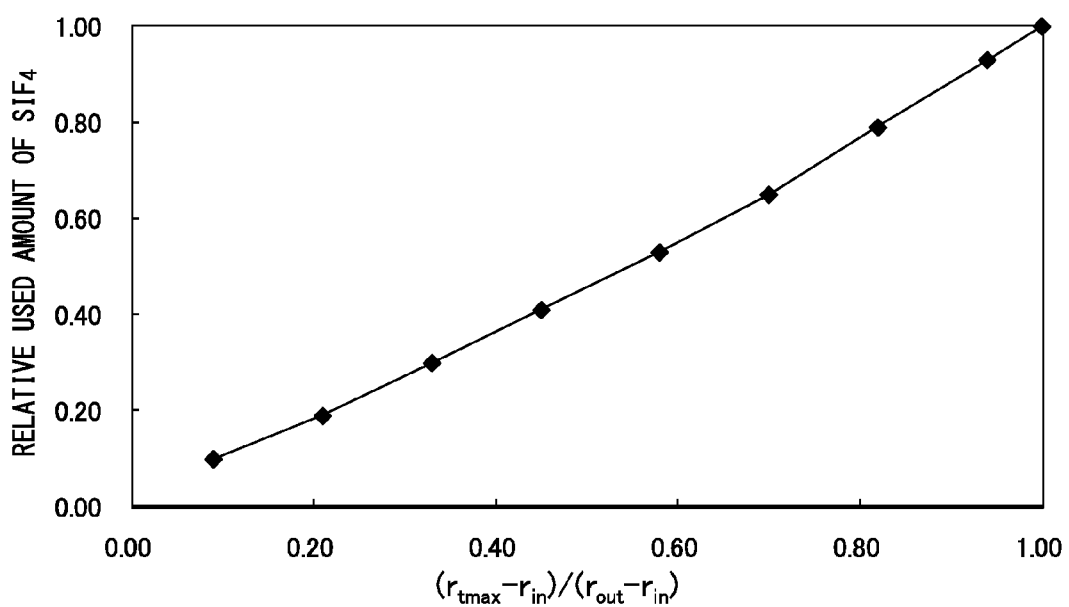
FIG. 10 is a graph on which the relative used amount of $SiF_4$ with respect to $(r_{tmax}-r_{in})/(r_{out}-r_{in})$ are plotted in Example 1.
Figure 11:
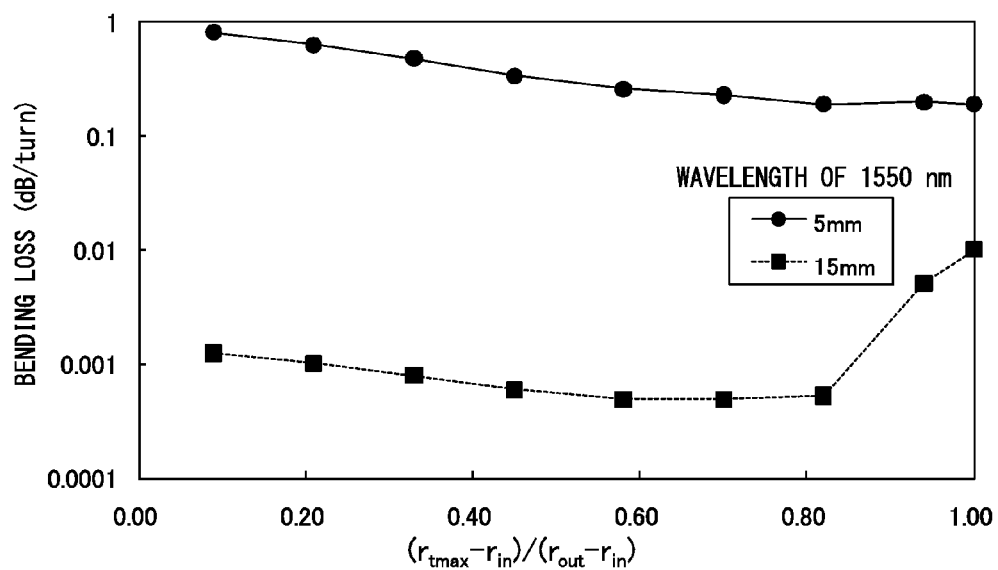
FIG. 11 is a graph on which bending losses in a wavelength of 1550 nm with respect to $(r_{tmax}-r_{in})/(r_{out}-r_{in})$ are plotted in Example 2.
Figure 12:
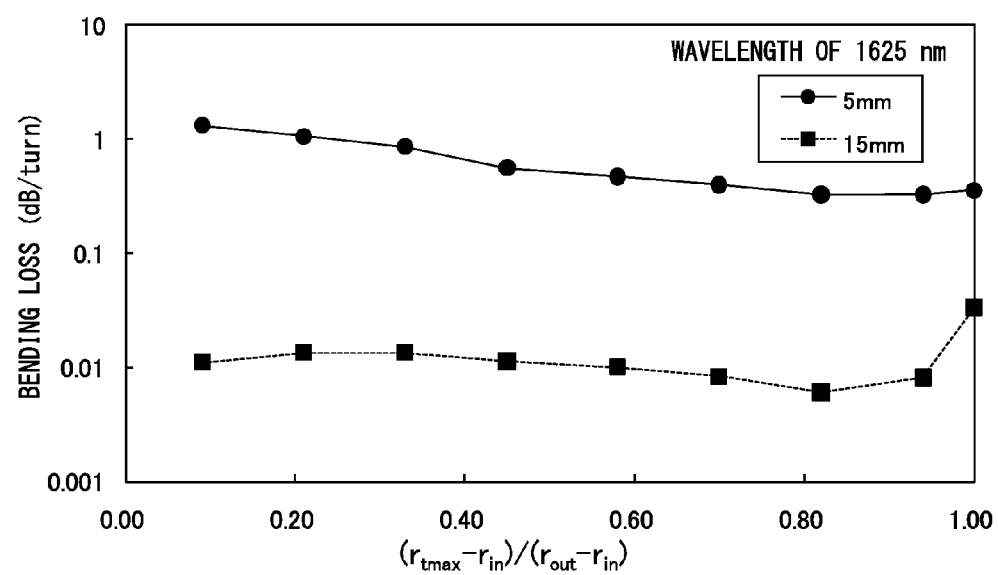
FIG. 12 is a graph on which bending losses in a wavelength of 1625 nm with respect to $(r_{tmax}-r_{in})/(r_{out}-r_{in})$ are plotted in Example 2.
Figure 13:
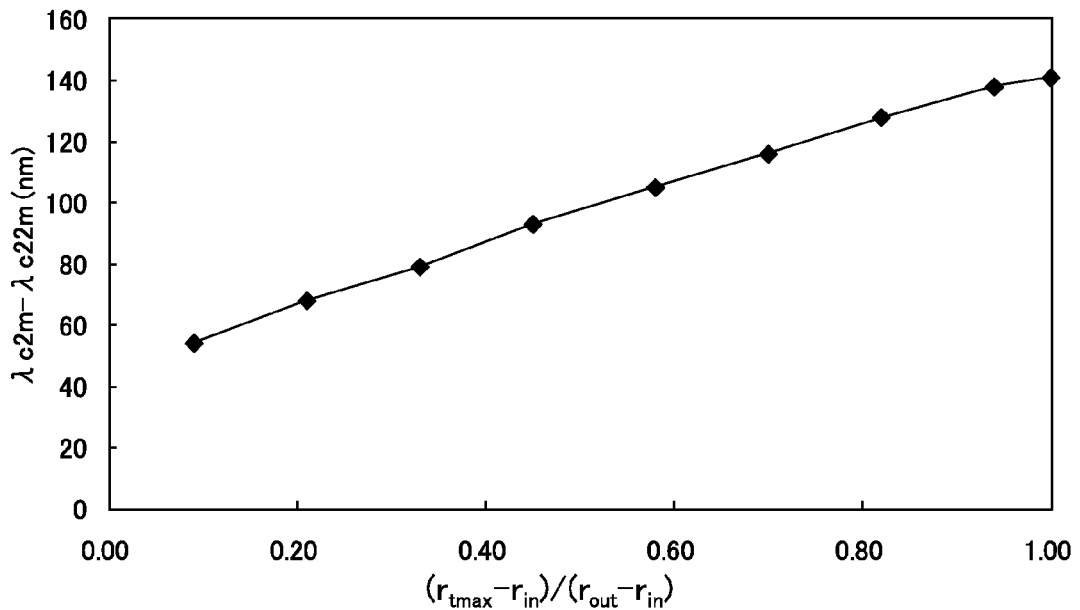
FIG. 13 is a graph on which $\lambda_{c2m}-\lambda_{c22m}$ with respect to $(r_{tmax}-r_{in})/(r_{out}-r_{in})$ are plotted in Example 2.
Figure 14:
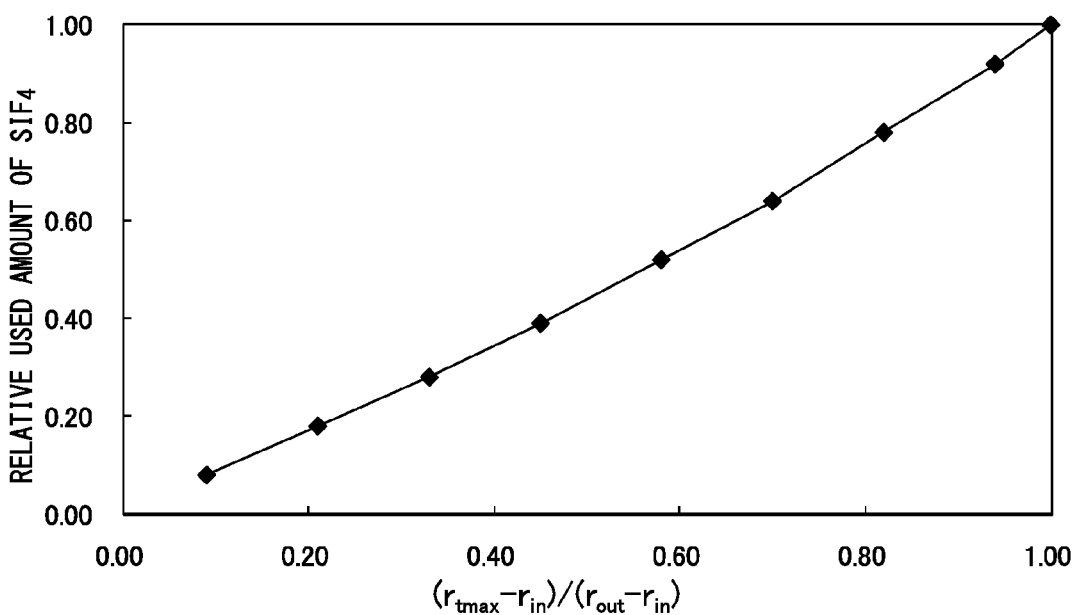
FIG. 14 is a graph on which the relative used amount of $SiF_4$ with respect to $(r_{tmax}-r_{in})/(r_{out}-r_{in})$ are plotted in Example 2.

In other cases, the case of $(r_{tmax}-r_{in})/(r_{out}-r_{in})=1.0$ means a conventional trench structure in which the relative refractive index difference $\Delta_t$ is $\Delta_{tmin}$ as shown in FIG. 6.

Moreover, the smaller the relative refractive index difference $\Delta$, the more the used amount of $SiF_4$ of a raw material increases; therefore it is possible to effectively reduce the cost of raw materials by using a structure which makes the relative refractive index difference $\Delta_{tmax}$ of the trench-external layer high.

Figure 4:
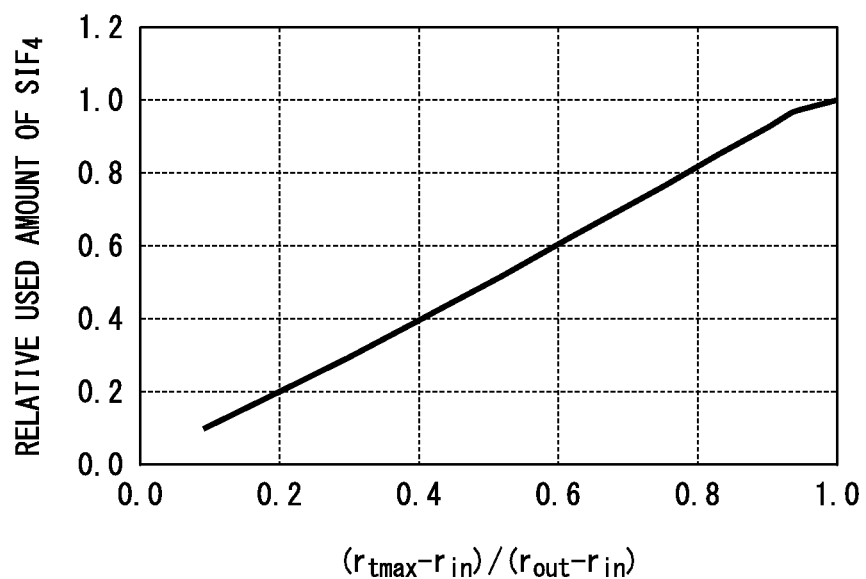
FIG. 4 is a graph illustrating an example of change in the relative used amount of $SiF_4$ with respect to $(r_{tmax}-r_{in})/(r_{out}-r_{in})$.

FIG. 4 shows an example of change in the used amount of $SiF_4$ in the case of $r_{in}/r_{core}=2.25$, $r_{out}/r_{core}=3.9$, $\Delta_{ic}=0.0\%$, $\Delta_{tmin}=-0.5\%$, $\Delta_{tmax}=-0.20\%$ where the trench coating 13 is constituted of two layers as shown in FIG. 1.

The used amount of $SiF_4$ in this case is based on the amount of F which is introduced into glass and does not include influence of deposition efficiency.

Due to making $(r_{tmax}-r_{in})/(r_{out}-r_{in})$ less than or equal to 0.9, it is possible to reduce the used amount of $SiF_4$ by approximately 10% as compared with a conventional trench structure.

Due to making $(r_{tmax}-r_{in})/(r_{out}-r_{in})$ less than or equal to 0.8, it is possible to reduce the used amount of $SiF_4$ by approximately 20% or more as compared with a conventional trench structure.

Furthermore, in the case of $(r_{tmax}-r_{in})/(r_{out}-r_{in}) \leq 0.5$, it is possible to reduce the used amount of $SiF_4$ by approximately 50% or more as compared with a conventional trench structure, and this is more preferable.

Figure 3:
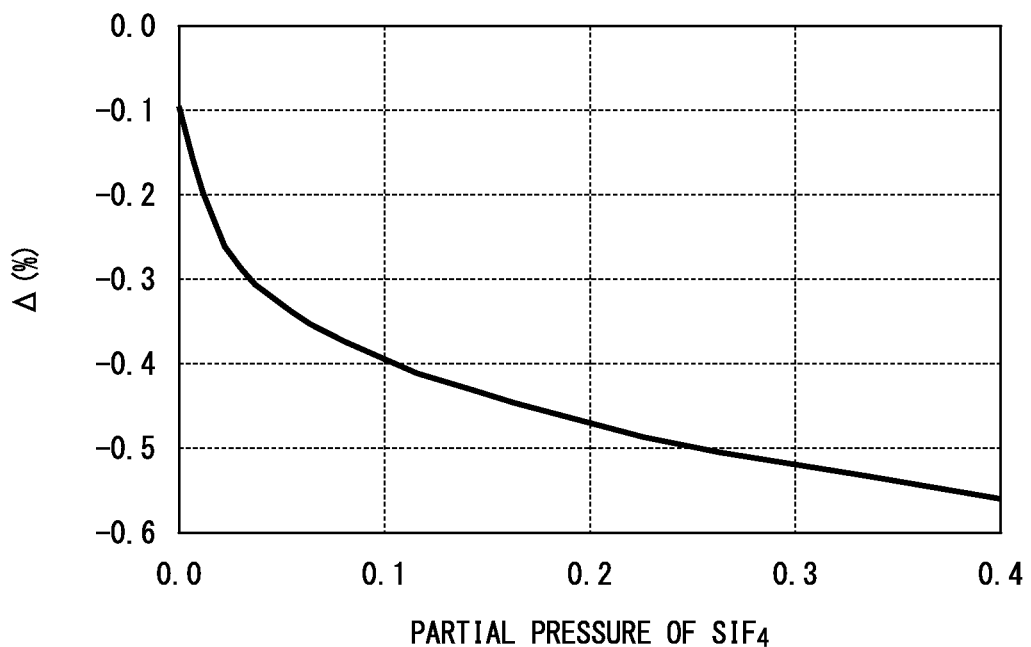
FIG. 3 is a graph illustrating an example of the relationship between the partial pressure of $SiF_4$ and the relative refractive index difference of the resultant glass in the case of forming a trench coating by use of a modified chemical vapor deposition method.

Additionally, in a process of continuously carrying out soot deposition and vitrification such as a modified chemical vapor deposition process as illustrated by using an example of the above-described FIG. 3, since the deposited glass is etched by the gas into which F of the raw material is introduced, there is a problem in that deposition efficiency decreases.

Consequently, the effect of decreasing the used amount of $SiF_4$ becomes greater than that of the calculated result as shown in FIG. 4.

In other cases, a source material gas used for F-doping into glass is not limited to $SiF_4$, in addition, a mixed gas can be used which includes one or more of CF4, SF6, F2, or the like, or such source material gases.

Such gases including F are all expensive, but, without depending on the types of the source material gas, it is possible to effectively reduce the cost of raw materials by using the structure which makes the relative refractive index difference $\Delta_{tmax}$ of the trench-external layer high.

Moreover, the optical fiber of the above-described embodiment has an advantage of promptly attenuating a higher order mode (particularly, even where the length thereof is short).

Figure 5:
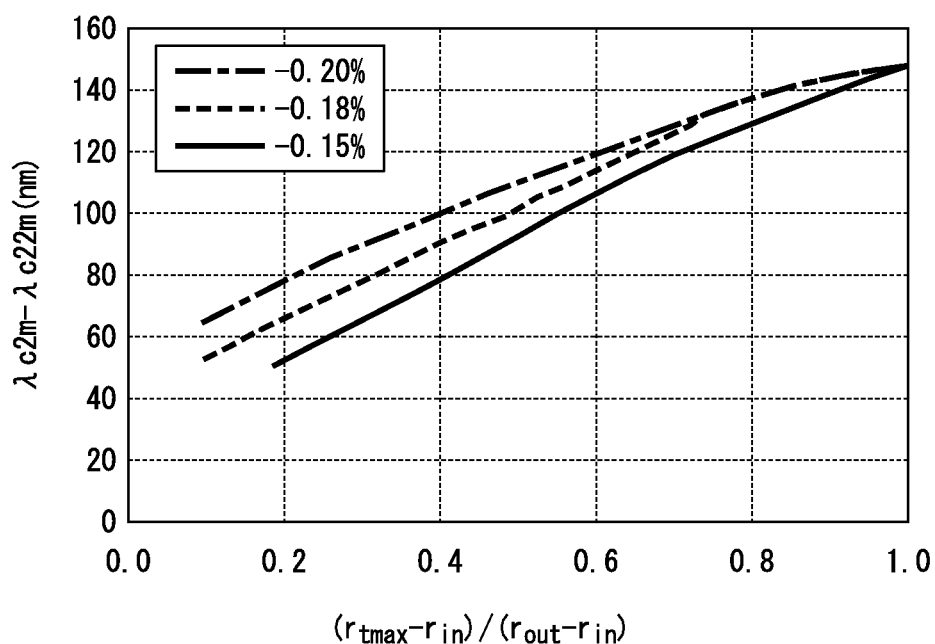
FIG. 5 is a graph illustrating an example of change in cut-off wavelength difference between 2 m and 22 m with respect to $(r_{tmax}-r_{in})/(r_{out}-r_{in})$.

FIG. 5 illustrates dependency of cases of $r_{in}/r_{core}=2.25$, $r_{out}/r_{core}=3.9$, $\Delta_{ic}=0.0\%$, $\Delta_{tmin}-0.5\%$, $\Delta_{tmax}=-0.15\%$, $-0.18\%$, or $-0.20\%$ with respect to $(r_{tmax}-r_{in})/(r_{out}-r_{in})$ the cut-off wavelength difference $\lambda_{c2m}-\lambda_{c22m}$ between 2 m and 22 m in the case where the trench coating 13 constituted of two layers as shown in FIG. 1.

In the case of $(r_{tmax}-r_{in})/(r_{out}-r_{in})=1$ in a conventional trench structure, the $\lambda_{c2m}-\lambda_{c22m}$ becomes 148 nm.

Additionally, in the case of a conventional SMF having a simple core-cladding structure which does not have a trench structure, the $\lambda_{c2m}-\lambda_{c22m}$ is approximately 50 nm.

In the disclosure of the above-described Louis-Anne de Montmorillon, et al, "Recent Developments of Bend-insensitive and Ultra-bend-insensitive Fibers Fully Compliant with Both G.657.B and G.652.D ITU-T Recommendations", Proceedings of the 58th IWCS/IICIT, International Wire & Cable Symposium, 2009, pp. 270-276, there is no problem in practice even where $\lambda_{c2m}-\lambda_{c22m}$ is approximately 150 nm, however, it is desirable that $\lambda_{c2m}-\lambda_{c22m}$ be made as short as possible.

As evidenced by FIG. 5, it is possible to reduce $\lambda_{c2m}-\lambda_{c22m}$ without deteriorating the bending loss of r=5 mm by suitably determining $(r_{tmax}-r_{in})/(r_{out}-r_{in})$.

If $(r_{tmax}-r_{in})/(r_{out}-r_{in})$ is less than or equal to 0.8, $\lambda_{c2m}-\lambda_{c22m}$ can be shortened by approximately 10 nm, furthermore, if $(r_{tmax}-r_{in})/(r_{out}-r_{in})$ is less than or equal to 0.5, $\lambda_{c2m}-\lambda_{c22m}$ can be shortened by approximately 40 nm as compared with a conventional trench structure.

EXAMPLES

Hereinbelow, the invention will be particularly described with reference to Examples.

Comparative Example 1

Each Example described below shows an example of the optical fiber produced and provided with a conventional trench structure in order to compare Examples to each other.

FIG. 6 schematically shows a refractive index profile of an optical fiber having a conventional trench structure.

The optical fiber was provided with a core 1 disposed at a central portion; an internal cladding coat 2 disposed at the periphery of the core 1 and having a refractive index less than that of the core 1; a trench coating 3 disposed at the periphery of the internal cladding coat 2; and an outermost cladding coat 4 disposed at the periphery of the trench coating 13.

The relative refractive index difference of the core 1 is represented as $\Delta_{core}$, the relative refractive index difference of the internal cladding coat 2 is represented as $\Delta_{ic}$, the relative refractive index difference of the trench coating 3 is represented as $\Delta_t$, the radius of the core 1 is represented as $r_{core}$, the radius of the internal edge of the trench coating 3 is represented as $r_{in}$, and the radius of the external edge of the trench coating 3 is represented as $r_{out}$ where the relative refractive index differences are based on the refractive index of the outermost cladding coat 4.

Parameters and the values of Comparative Example 1 are shown in Table 1 and the characteristics thereof are shown in Table 2.

Additionally, each of the bending losses (dB/turn) in the bending radiuses in wavelengths of 1550 nm and 1625 nm is shown in Table 3.

TABLE 1

| Comparative Example 1: Parameters | |
|---|---|
| $r_{in}/r_{core}$ | 2.50 |
| $r_{out}/r_{core}$ | 3.90 |
| $r_{out}$ | 14.9 µm |
| $\Delta_{core}$ | 0.330% |
| $\Delta_{ic}$ | 0.00% |
| $\Delta_t$ | −0.50% |

TABLE 2

Comparative Example 1: Optical Characteristics

| | |
|---|---|
| Cable Cut-off wavelength of 2 m ($\lambda c2m$) | 1368 nm |
| Cable Cut-off wavelength of 22 m ($\lambda c22m$) | 1220 nm |
| $\lambda c2m - \lambda c22m$ | 148 nm |
| MFD at 1310 nm | 8.9 μm |
| Zero-Dispersion Wavelength $\lambda_0$ | 1313 nm |
| Dispersion Slope $S_0$ in Zero-Dispersion Wavelength | 0.091 ps/nm²/km |

TABLE 3

Comparative Example 1: Bending Loss (dB/turn)

| | Wavelength | |
|---|---|---|
| Bending Radius | 1550 nm | 1625 nm |
| 15 mm | 0.010 | 0.008 |
| 10 mm | 0.051 | 0.060 |
| 7.5 mm | 0.071 | 0.108 |
| 5 mm | 0.325 | 0.471 |

Reference Example 1

The optical fiber of Reference Example 1 was constituted of a two-layer trench structure shown in FIG. 1.

The relative refractive index difference of the core 11 is represented as $\Delta_{core}$, the relative refractive index difference of the internal cladding coat 12 is represented as $\Delta_{ic}$, the relative refractive index difference of the layer 15 having the highest refractive index in the trench coating 13 is represented as $\Delta_{tmax}$, the relative refractive index difference of the layer 16 having the lowest refractive index in the trench coating 13 is represented as $\Delta_{tmin}$, the radius of the core 11 is represented as $r_{core}$, the radius of the internal edge of the trench coating 13 is represented as $r_{in}$, the radius of the external edge of the trench coating 13 is represented as $r_{out}$, and the radius of the internal edge of the layer 15 having the highest refractive index in the trench coating 13 is represented as $r_{tmax}$ where the relative refractive index differences are based on the refractive index of the outermost cladding coat 14.

Parameters and the values of Reference Example 1 are shown in Table 4 and the characteristics thereof are shown in Table 5.

Additionally, each of the bending losses (dB/turn) in the bending radiuses in wavelengths of 1550 nm and 1625 nm is shown in Table 6.

TABLE 4

Reference Example 1: Parameters

| | |
|---|---|
| $r_{in}/r_{core}$ | 2.25 |
| $r_{tmax}/r_{core}$ | 3.00 |
| $r_{out}/r_{core}$ | 3.90 |
| $r_{out}$ | 15.87 μm |
| $\Delta_{core}$ | 0.34% |
| $\Delta_{ic}$ | 0.00% |
| $\Delta_{t\,min}$ | −0.50% |
| $\Delta_{t\,max}$ | −0.20% |

TABLE 5

Reference Example 1: Optical Characteristics

| | |
|---|---|
| Cable Cut-off wavelength of 2 m ($\lambda c2m$) | 1325 nm |
| Cable Cut-off wavelength of 22 m ($\lambda c22m$) | 1220 nm |
| $\lambda c2m - \lambda c22m$ | 105 nm |
| MFD at 1310 nm | 8.9 μm |
| Zero-Dispersion Wavelength $\lambda_0$ | 1306 nm |
| Dispersion Slope $S_0$ in Zero-Dispersion Wavelength | 0.091 ps/nm²/km |

TABLE 6

Reference Example 1: Bending Loss (dB/turn)

| | Wavelength | |
|---|---|---|
| Bending Radius | 1550 nm | 1625 nm |
| 15 mm | 0.001 | 0.011 |
| 10 mm | 0.036 | 0.094 |
| 7.5 mm | 0.072 | 0.211 |
| 5 mm | 0.499 | 0.739 |

Regarding the bending loss, the MFD, the zero-dispersion wavelength 4, and the zero dispersion slope $S_0$, Reference Example 1 has substantially the same characteristics as that of Comparative Example 1, furthermore the $\lambda_{c2m}-\lambda_{c22m}$ thereof was 105 nm which was shorter than Comparative Example 1 by approximately 40 nm.

The $(r_{tmax}-r_{in})/(r_{out}-r_{in})$ was approximately 0.45, as evidenced by FIG. 4, the used amount of $SiF_4$ can be reduced by approximately 55% as compared with Comparative Example 1.

Reference Example 2

The optical fiber of Reference Example 2 was constituted of a three-layer trench structure shown in FIG. 2.

The relative refractive index difference of the core 21 is represented as $\Delta_{core}$, the relative refractive index difference of the internal cladding coat 22 is represented as $\Delta_{ic}$, the relative refractive index difference of the layer 25 having the highest refractive index in the trench coating 23 is represented as $\Delta_{tmax}$, the relative refractive index difference of the layer 26 having the intermediate value in the refractive index in the trench coating 23 is represented as $\Delta_{tmid}$, the relative refractive index difference of the layer 27 having the lowest refractive index in the trench coating is represented as $\Delta_{tmin}$, the radius of the core 21 is represented as $r_{core}$, the radius of the internal edge of the trench coating 23 is represented as $r_{in}$, the radius of the external edge of the trench coating 23 is represented as $r_{out}$, the radius of the internal edge of the layer 25 having the highest refractive index in the trench coating 23 is represented as $r_{tmax}$, the radius of the internal edge of the layer 26 having the intermediate value in the refractive index in the trench coating 23 is represented as $r_{tmid}$ where the relative refractive index differences are based on the refractive index of the outermost cladding coat 24.

Parameters and the values of Reference Example 2 are shown in Table 7 and the characteristics thereof are shown in Table 8.

Additionally, each of the bending losses (dB/turn) in the bending radiuses in wavelengths of 1550 nm and 1625 nm is shown in Table 9.

TABLE 7

Reference Example 2: Parameters

| | |
|---|---|
| $r_{in}/r_{core}$ | 2.25 |
| $r_{tmid}/r_{core}$ | 2.60 |
| $r_{tmax}/r_{core}$ | 3.30 |
| $r_{out}/r_{core}$ | 3.90 |
| $r_{out}$ | 15.9 μm |
| $\Delta_{core}$ | 0.34% |
| $\Delta_{ic}$ | 0.00% |
| $\Delta_{t\,min}$ | −0.50% |
| $\Delta_{t\,mid}$ | −0.30% |
| $\Delta_{t\,max}$ | −0.20% |

TABLE 8

Reference Example 2: Optical Characteristics

| | |
|---|---|
| Cable Cut-off wavelength of 2 m (λc2m) | 1321 nm |
| Cable Cut-off wavelength of 22 m (λc22m) | 1220 nm |
| λc2m − λc22m | 101 nm |
| MFD at 1310 nm | 8.9 μm |
| Zero-Dispersion Wavelength $\lambda_0$ | 1313 nm |
| Dispersion Slope $S_0$ in Zero-Dispersion Wavelength | 0.091 ps/nm²/km |

TABLE 9

Reference Example 2: Bending Loss (dB/turn)

| | Wavelength | |
|---|---|---|
| Bending Radius | 1550 nm | 1625 nm |
| 15 mm | 0.001 | 0.013 |
| 10 mm | 0.034 | 0.106 |
| 7.5 mm | 0.071 | 0.243 |
| 5 mm | 0.490 | 0.809 |

Regarding the bending loss, the MFD, the zero-dispersion wavelength $\lambda_0$, and the zero dispersion slope $S_0$, Reference Example 2 has substantially the same characteristics as that of Comparative Example 1. Furthermore, the $\lambda_{c2m}-\lambda_{c22m}$ thereof was 101 nm which was shorter than Comparative Example 1 by approximately 47 nm.

The $(r_{tmax}-r_{in})/(r_{out}-r_{in})$ was approximately 0.63 which was higher than that of Reference Example 1, but it was possible to reduce the cross-sectional area of layer having the relative refractive index difference Δ of −0.5% by separating the trench coating 23 into the three layers.

For this reason, Reference Example 2 can reduce the used amount of $SiF_4$ by approximately 75% as compared with Comparative Example 1 and realize a significant reduction greater than that of Reference Example 1 (reduction in approximately 55% as compared with Comparative Example 1).

Example 1

The optical fiber of Example 1 was constituted of a two-layer trench structure shown in FIG. 1.

The relative refractive index difference of the core 11 is represented as $\Delta_{core}$, the relative refractive index difference of the internal cladding coat 12 is represented as $\Delta_{ic}$, the relative refractive index difference of the layer 15 having the highest refractive index in the trench coating 13 is represented as $\Delta_{tmax}$, the relative refractive index difference of the layer 16 having the lowest refractive index in the trench coating 13 is represented as $\Delta_{tmin}$, the radius of the core 11 is represented as $r_{core}$, the radius of the internal edge of the trench coating 13 is represented as $r_{in}$, the radius of the external edge of the trench coating 13 is represented as $r_{out}$, and the radius of the internal edge of the layer 15 having the highest refractive index in the trench coating 13 is represented as $r_{tmax}$ where the relative refractive index differences are based on the refractive index of the outermost cladding coat 14.

In Example 1, $r_{tmax}$ was determined so that $(r_{tmax}-r_{in})/(r_{out}-r_{in})$ becomes the values shown in Table 12, and $\Delta_{core}$ was adjusted and the optical fiber was thereby designed so that $\lambda_{c22m}$ becomes 1220 nm as shown in Table 10 and the MFD in a wavelength of 1310 nm becomes 8.6 μm for each value.

TABLE 10

Common Optical Characteristics in Example 1 to 4

| | |
|---|---|
| Cable Cut-off wavelength of 22 m (λc22m) | 1220 nm |
| MFD at 1310 nm | 8.6 μm |

The parameters of the refractive index profile in Example 1 are shown in Table 11.

TABLE 11

Example 1: Parameters

| | |
|---|---|
| $r_{in}/r_{core}$ | 2.25 |
| $r_{out}/r_{core}$ | 3.90 |
| $r_{tmax}/r_{core}$ | 2.40 to 3.80 |
| $\Delta_{core}$ | 0.359 to 0.373% |
| $\Delta_{ic}$ | 0.00% |
| $\Delta_{t\,max}$ | −0.20% |
| $\Delta_{t\,min}$ | −0.40% |

Additionally, the bending loss in the bending radiuses of wavelengths of 1550 nm and 1625 nm for each value $(r_{tmax}-r_{in})/(r_{out}-r_{in})$, the difference $\lambda_{c2m}-\lambda_{c22m}$, and the ratio of the used amount of $SiF_4$ with reference to the used amount of $SiF_4$ in the single layer trench structure (the relative used amount of $SiF_4$) are shown in Table 12.

TABLE 12

Example 1

| | Bending Loss (dB/turn) | | | | | |
|---|---|---|---|---|---|---|
| | Wavelength of 1550 nm | | Wavelength of 1625 nm | | | |
| $(r_{tmax}-r_{in})/(r_{out}-r_{in})$ | Bending Radius 5 mm | Bending Radius 15 mm | Bending Radius 5 mm | Bending Radius 15 mm | λc2m − λc22m (nm) | Relative Used Amount of $SiF_4$ |
| 0.09 | 0.82 | 0.00122 | 1.50 | 0.00963 | 52 | 0.10 |
| 0.21 | 0.69 | 0.00108 | 1.19 | 0.01185 | 62 | 0.19 |
| 0.33 | 0.56 | 0.00092 | 0.98 | 0.01185 | 71 | 0.30 |

TABLE 12-continued

Example 1

| | Bending Loss (dB/turn) | | | | | |
|---|---|---|---|---|---|---|
| | Wavelength of 1550 nm | | Wavelength of 1625 nm | | | Relative Used |
| $(r_{tmax}-r_{in})/(r_{out}-r_{in})$ | Bending Radius 5 mm | Bending Radius 15 mm | Bending Radius 5 mm | Bending Radius 15 mm | $\lambda c2m - \lambda c22m$ (nm) | Amount of $SiF_4$ |
| 0.45 | 0.43 | 0.00074 | 0.76 | 0.01228 | 81 | 0.41 |
| 0.58 | 0.32 | 0.00058 | 0.52 | 0.01023 | 92 | 0.53 |
| 0.70 | 0.27 | 0.00051 | 0.45 | 0.00972 | 102 | 0.65 |
| 0.82 | 0.24 | 0.00048 | 0.39 | 0.00882 | 112 | 0.79 |
| 0.94 | 0.20 | 0.00049 | 0.33 | 0.00691 | 123 | 0.93 |
| 1.00 | 0.25 | 0.00100 | 0.35 | 0.00631 | 129 | 1.00 |

In other cases, an example of $(r_{tmax}-r_{in})/(r_{out}-r_{in})=1.00$ was an optical fiber provided with a conventionally-designed single layer trench structure.

In the case where $(r_{tmax}-r_{in})/(r_{out}-r_{in})$ was in the range of 0.70 to 0.90, it was 1 possible to produce the optical fiber provided with a two-layer trench structure having the bending loss that was less than or equal to that of a conventionally-designed single layer trench structure.

When $(r_{tmax}-r_{in})/(r_{out}-r_{in})$ was 0.70, it was possible to shorten $\lambda_{c2m}-\lambda_{c22m}$ by 27 nm as a conventionally-designed single layer trench structure, and it was possible to reduce the used amount of $SiF_4$ by approximately 35%.

Also, when $(r_{tmax}-r_{in})/(r_{out}-r_{in})$ was 0.90, it was possible to shorten $\lambda_{c2m}-\lambda_{c22m}$ by approximately 10 nm, and it was possible to reduce the used amount of $SiF_4$ by approximately 10%.

FIGS. 7 to 10 show graphs on which the bending losses, $\lambda_{c2m}-\lambda_{c22m}$, and the relative used amount of $SiF_4$ shown in Table 12 are plotted.

Example 2

Example 2 shows an example of a two-layer trench structure having $\Delta_{tmin}$ of −0.50% which were designed so as to have $\lambda_{c22m}$ and the MFD (with reference to Table 10) similar to Example 1.

The parameters of the refractive index profile thereof in Example 2 are shown in Table 13.

TABLE 13

| Example 2: Parameters | |
|---|---|
| $r_{in}/r_{core}$ | 2.25 |
| $r_{out}/r_{core}$ | 3.90 |
| $r_{tmax}/r_{core}$ | 2.40 to 3.80 |
| $\Delta_{core}$ | 0.350 to 0.372% |
| $\Delta_{ic}$ | 0.00% |
| $\Delta_{t\,max}$ | −0.20% |
| $\Delta_{t\,min}$ | −0.50% |

The bending loss in the bending radiuses of wavelengths of 1550 nm and 1625 nm for each value $(r_{tmax}-r_{in})/(r_{out}-r_{in})$, the difference in $\lambda_{c2m}-\lambda_{c22m}$, and the relative used amount of $SiF_4$ are shown in Table 14.

TABLE 14

Example 2

| | Bending Loss (dB/turn) | | | | | |
|---|---|---|---|---|---|---|
| | Wavelength of 1550 nm | | Wavelength of 1625 nm | | | Relative Used |
| $(r_{tmax}-r_{in})/(r_{out}-r_{in})$ | Bending Radius 5 mm | Bending Radius 15 mm | Bending Radius 5 mm | Bending Radius 15 mm | $\lambda c2m - \lambda c22m$ (nm) | Amount of $SiF_4$ |
| 0.09 | 0.82 | 0.00125 | 1.33 | 0.01107 | 54 | 0.08 |
| 0.21 | 0.63 | 0.00101 | 1.06 | 0.01345 | 68 | 0.18 |
| 0.33 | 0.48 | 0.00080 | 0.86 | 0.01346 | 79 | 0.28 |
| 0.45 | 0.34 | 0.00060 | 0.56 | 0.01128 | 93 | 0.39 |
| 0.58 | 0.26 | 0.00049 | 0.47 | 0.01003 | 105 | 0.52 |
| 0.70 | 0.23 | 0.00049 | 0.40 | 0.00830 | 116 | 0.64 |
| 0.82 | 0.19 | 0.00053 | 0.33 | 0.00605 | 128 | 0.78 |
| 0.94 | 0.20 | 0.00510 | 0.33 | 0.00816 | 138 | 0.92 |
| 1.00 | 0.19 | 0.01006 | 0.36 | 0.03369 | 141 | 1.00 |

In the case where $(r_{tmax}-r_{in})/(r_{out}-r_{in})$ was in the range of 0.70 to 0.90, preferably, 0.70 to 0.80, it was possible to produce the optical fiber provided with a two-layer trench structure having the bending loss that was less than or equal to that of a conventionally-designed single layer trench structure.

When $(r_{tmax}-r_{in})/(r_{out}-r_{in})$ was 0.70, it was possible to shorten $\lambda_{c2m}-\lambda_{c22m}$ by 25 nm as a conventionally-designed single layer trench structure, and it was possible to reduce the used amount of $SiF_4$ by approximately 36%.

Also, when $(r_{tmax}-r_{in})/(r_{out}-r_{in})$ was 0.90, it was possible to shorten $\lambda_{c2m}-\lambda_{c22m}$ by approximately 5 nm, and it was possible to reduce the used amount of $SiF_4$ by approximately 10%.

FIGS. 11 to 14 show graphs on which the bending losses, $\lambda_{c2m}-\lambda_{c22m}$, and the relative used amount of $SiF_4$ shown in Table 14 are plotted.

Example 3

Example 3 shows an example of a two-layer trench structure having $\Delta_{tmax}$ of −0.15% or −0.25% which were designed so as to have $\lambda_{c22m}$ and the MFD (with reference to Table 10) similar to Example 1.

The bending loss in the bending radiuses of wavelengths of 1550 nm and 1625 nm for each value $(r_{tmax}-r_{in})/(r_{out}-r_{in})$, the difference in $\lambda_{c2m}-\lambda_{c22m}$ and the relative used amount of $SiF_4$ are shown in Tables 15 and 16.

Particularly, Tables 15 and 16 correspond to $\Delta_{tmax}$ of −0.15% and −0.25%, respectively.

TABLE 15

Example 3: $\Delta_{tmax} = -0.15\%$

| | Bending Loss (dB/turn) | | | | | |
|---|---|---|---|---|---|---|
| | Wavelength of 1550 nm | | Wavelength of 1625 nm | | | Relative Used |
| $(r_{tmax}-r_{in})/(r_{out}-r_{in})$ | Bending Radius 5 mm | Bending Radius 15 mm | Bending Radius 5 mm | Bending Radius 15 mm | λc2m − λc22m (nm) | Amount of $SiF_4$ |
| 0.09 | 1.59 | 0.00185 | 2.38 | 0.00838 | 39 | 0.08 |
| 0.21 | 1.10 | 0.00144 | 1.74 | 0.00990 | 43 | 0.17 |
| 0.33 | 0.88 | 0.00126 | 1.33 | 0.01129 | 51 | 0.28 |
| 0.45 | 0.63 | 0.00098 | 0.96 | 0.01022 | 61 | 0.39 |
| 0.58 | 0.48 | 0.00080 | 0.80 | 0.01103 | 73 | 0.51 |
| 0.70 | 0.31 | 0.00057 | 0.57 | 0.01099 | 90 | 0.64 |
| 0.82 | 0.24 | 0.00047 | 0.42 | 0.00933 | 105 | 0.78 |
| 0.94 | 0.21 | 0.00047 | 0.33 | 0.00729 | 122 | 0.92 |
| 1.00 | 0.25 | 0.00100 | 0.35 | 0.00631 | 129 | 1.00 |

TABLE 16

Example 3: $\Delta_{tmax} = -0.25\%$

| | Bending Loss (dB/turn) | | | | | |
|---|---|---|---|---|---|---|
| | Wavelength of 1550 nm | | Wavelength of 1625 nm | | | Relative Used |
| $(r_{tmax}-r_{in})/(r_{out}-r_{in})$ | Bending Radius 5 mm | Bending Radius 15 mm | Bending Radius 5 mm | Bending Radius 15 mm | λc2m − λc22m (nm) | Amount of $SiF_4$ |
| 0.09 | 0.53 | 0.00091 | 0.89 | 0.01190 | 75 | 0.16 |
| 0.21 | 0.37 | 0.00067 | 0.62 | 0.01097 | 85 | 0.25 |
| 0.33 | 0.32 | 0.00059 | 0.55 | 0.01063 | 92 | 0.34 |
| 0.45 | 0.29 | 0.00055 | 0.49 | 0.01035 | 99 | 0.45 |
| 0.58 | 0.25 | 0.00050 | 0.46 | 0.00999 | 105 | 0.56 |
| 0.70 | 0.25 | 0.00050 | 0.44 | 0.00963 | 112 | 0.68 |
| 0.82 | 0.23 | 0.00050 | 0.38 | 0.00836 | 118 | 0.80 |
| 0.94 | 0.19 | 0.00048 | 0.33 | 0.00658 | 126 | 0.93 |
| 1.00 | 0.25 | 0.00100 | 0.35 | 0.00631 | 129 | 1.00 |

Figure 15:
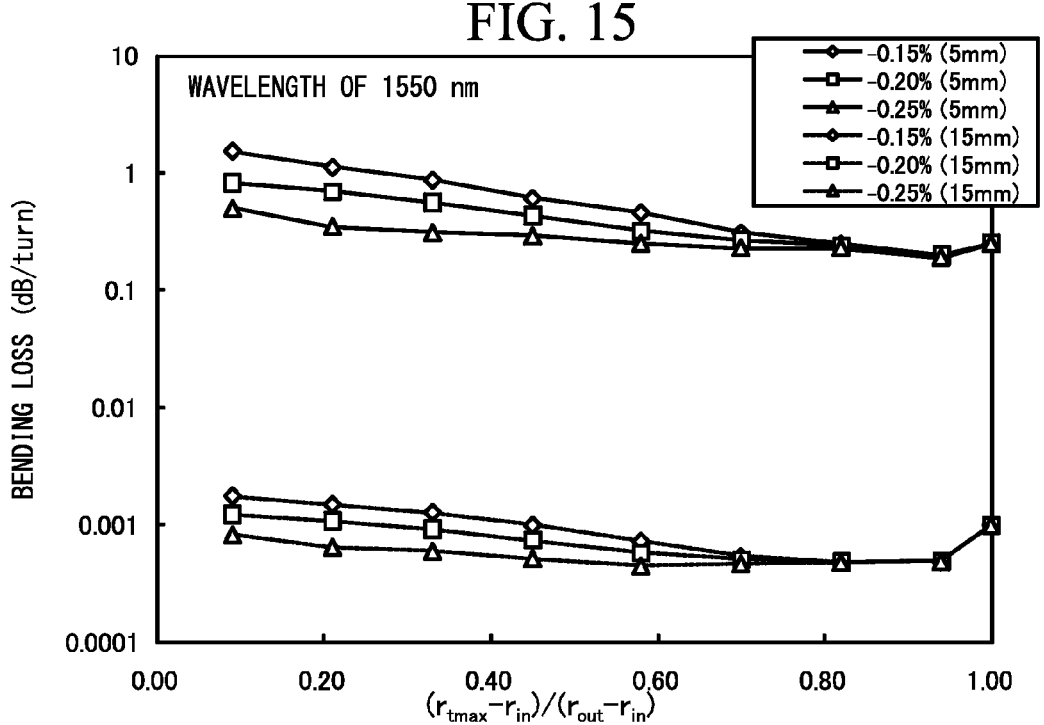
FIG. 15 is a graph on which bending losses in a wavelength of 1550 nm with respect to $(r_{tmax}-r_{in})/(r_{out}-r_{in})$ are plotted in Example 3.
Figure 16:
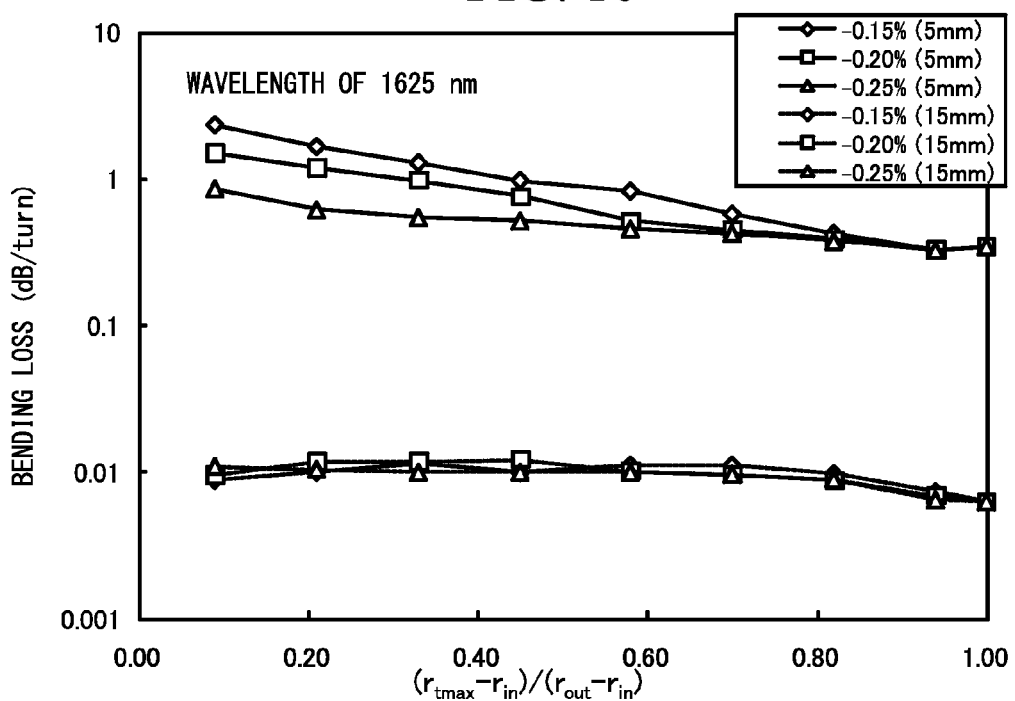
FIG. 16 is a graph on which bending losses in a wavelength of 1625 nm with respect to $(r_{tmax}-r_{in})/(r_{out}-r_{in})$ are plotted in Example 3.

The bending losses in a wavelength of 1550 nm at the bending radiuses of 5 mm and 15 mm is shown in FIG. 15, and the bending loss in a wavelength of 1625 nm at the same bending radius is shown in FIG. 16.

The solid line located at the upper portion of FIGS. 15 and 16 showed the bending loss at bending radius of 5 mm, and the broken line located at the lower portion showed the bending loss at bending radius of 15 mm.

Figure 17:
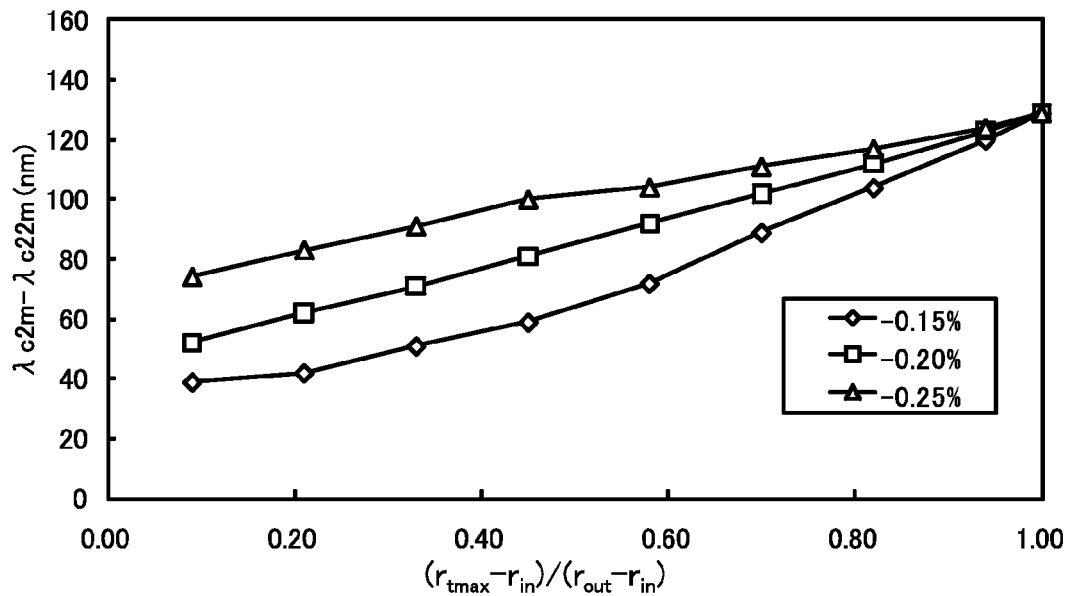
FIG. 17 is a graph on which $\lambda_{c2m}-\lambda_{c22m}$ with respect to $(r_{tmax}-r_{in})/(r_{out}-r_{in})$ are plotted in Example 3.
Figure 18:
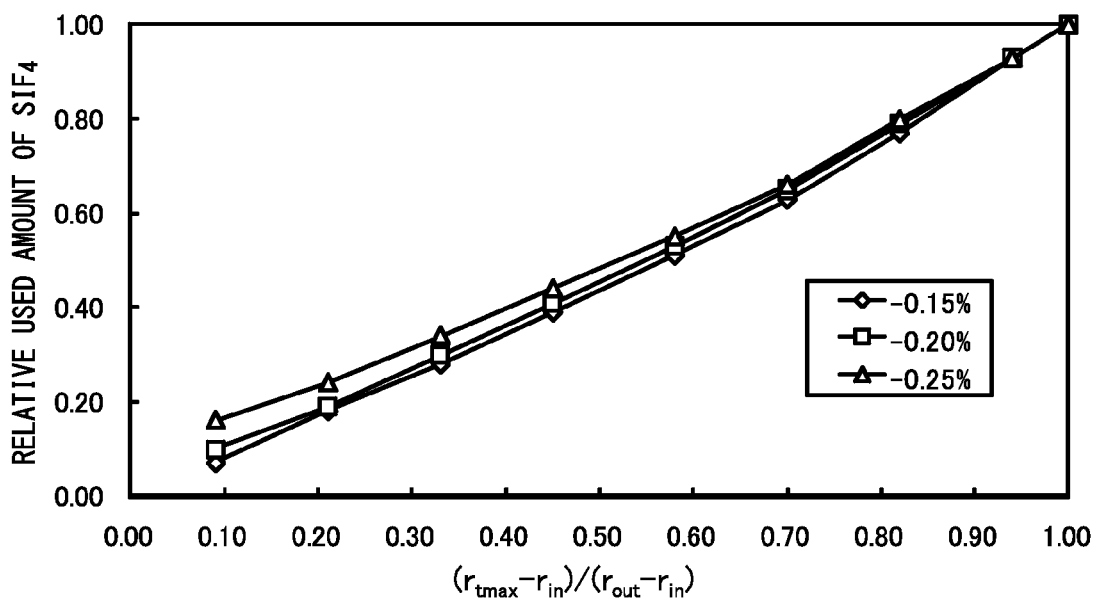
FIG. 18 is a graph on which the relative used amount of $SiF_4$ with respect to $(r_{tmax}-r_{in})/(r_{out}-r_{in})$ are plotted in Example 3.

Additionally, $\lambda_{c2m}-\lambda_{c22m}$ is shown in FIG. 17, and the relative used amount of $SiF_4$ is shown in FIG. 18.

In addition, the data in the case where $\Delta_{tmax}$ was −0.20% adopted in Example 1 are plotted in the FIGS. 15 to 18.

As shown in FIGS. 15 and 16, in the case where $(r_{tmax}-r_{in})/(r_{out}-r_{in})$ was in the range of 0.70 to 0.90 with respect to $-0.15\% \geq \Delta_{tmax} \geq -0.25\%$, it was possible to produce the optical fiber provided with a two-layer trench structure having the bending loss that was less than or equal to that of a conventionally-designed single layer trench structure.

As shown in FIGS. 17 and 18, when $(r_{tmax}-r_{in})/(r_{out}-r_{in})$ was 0.70, it was possible to shorten $\lambda_{c2m}-\lambda_{c22m}$ by approximately 20 to 40 nm as a conventionally-designed single layer trench structure, and it was possible to reduce the used amount of $SiF_4$ by approximately 35%.

Also, when $(r_{tmax}-r_{in})/(r_{out}-r_{in})$ was 0.90, it was possible to shorten $\lambda_{c2m}-\lambda_{c22m}$ by approximately 8 to 15 nm, and it was possible to reduce the used amount of $SiF_4$ by approximately 10%.

Example 4

Example 4 shows an example of a two-layer trench structure having $\Delta_{tmin}$ of −0.50% and $\Delta_{tmax}$ of −0.15% or −0.25% which were designed so as to have $\lambda_{c22m}$ and the MFD (with reference to Table 10) similar to Example 1.

That is, $\Delta_{tmin}$ was equal to that of Example 2, and $\Delta_{tmax}$ was only changed from Example 2.

The bending loss in the bending radiuses of wavelengths of 1550 nm and 1625 nm for each value $(r_{tmax}-r_{in})/(r_{out}-r_{in})$, the difference in $\lambda_{c2m}-\lambda_{c22m}$, and the relative used amount of $SiF_4$ are shown in Tables 17 and 18.

Particularly, Tables 17 and 18 correspond to $\Delta_{tmax}$ of −0.15% and −0.25%, respectively.

TABLE 17

Example 4: $\Delta_{tmax} = -0.15\%$

| | Bending Loss (dB/turn) | | | | | |
|---|---|---|---|---|---|---|
| | Wavelength of 1550 nm | | Wavelength of 1625 nm | | | Relative Used |
| $(r_{tmax}-r_{in})/(r_{out}-r_{in})$ | Bending Radius 5 mm | Bending Radius 15 mm | Bending Radius 5 mm | Bending Radius 15 mm | λc2m − λc22m (nm) | Amount of $SiF_4$ |
| 0.09 | 1.55 | 0.00182 | 2.31 | 0.00899 | 39 | 0.07 |
| 0.21 | 0.99 | 0.00135 | 1.58 | 0.01110 | 47 | 0.17 |
| 0.33 | 0.75 | 0.00111 | 1.14 | 0.01194 | 58 | 0.28 |
| 0.45 | 0.52 | 0.00084 | 0.88 | 0.01251 | 72 | 0.39 |
| 0.58 | 0.35 | 0.00061 | 0.58 | 0.01126 | 90 | 0.51 |
| 0.70 | 0.25 | 0.00048 | 0.41 | 0.00912 | 108 | 0.64 |
| 0.82 | 0.22 | 0.00052 | 0.36 | 0.00716 | 123 | 0.78 |
| 0.94 | 0.20 | 0.00346 | 0.28 | 0.00540 | 138 | 0.92 |
| 1.00 | 0.19 | 0.01006 | 0.36 | 0.03369 | 141 | 1.00 |

TABLE 18

Example 4: $\Delta_{tmax} = -0.25\%$

| | Bending Loss (dB/turn) | | | | | |
|---|---|---|---|---|---|---|
| | Wavelength of 1550 nm | | Wavelength of 1625 nm | | | Relative |
| $(r_{tmax}-r_{in})/(r_{out}-r_{in})$ | Bending Radius 5 mm | Bending Radius 15 mm | Bending Radius 5 mm | Bending Radius 15 mm | λc2m − λc22m (nm) | Used Amount of $SiF_4$ |
| 0.09 | 0.52 | 0.00090 | 0.88 | 0.01251 | 78 | 0.10 |
| 0.21 | 0.34 | 0.00062 | 0.56 | 0.01118 | 92 | 0.19 |
| 0.33 | 0.29 | 0.00054 | 0.48 | 0.01030 | 101 | 0.30 |
| 0.45 | 0.25 | 0.00050 | 0.41 | 0.00893 | 109 | 0.41 |
| 0.58 | 0.24 | 0.00052 | 0.41 | 0.00819 | 117 | 0.53 |
| 0.70 | 0.22 | 0.00056 | 0.35 | 0.00650 | 125 | 0.65 |
| 0.82 | 0.23 | 0.00120 | 0.29 | 0.00531 | 131 | 0.79 |
| 0.94 | 0.20 | 0.00615 | 0.36 | 0.01961 | 139 | 0.93 |
| 1.00 | 0.19 | 0.01006 | 0.36 | 0.03369 | 141 | 1.00 |

Figure 19:
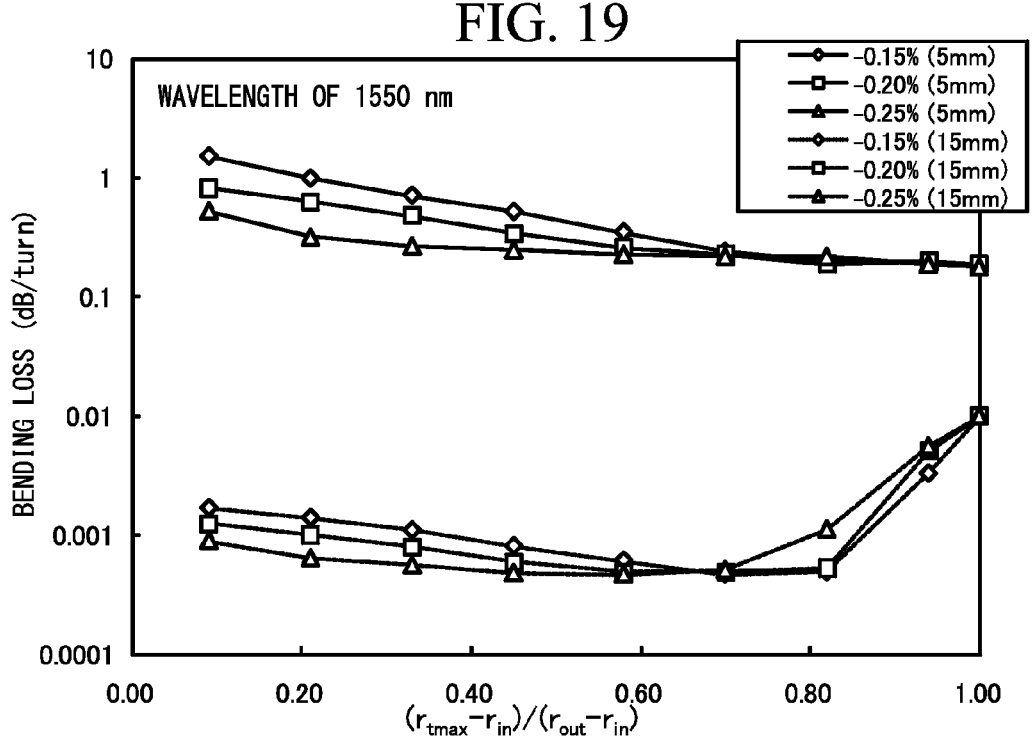
FIG. 19 is a graph on which bending losses in a wavelength of 1550 nm with respect to $(r_{tmax}-r_{in})/(r_{out}-r_{in})$ are plotted in Example 4.
Figure 20:
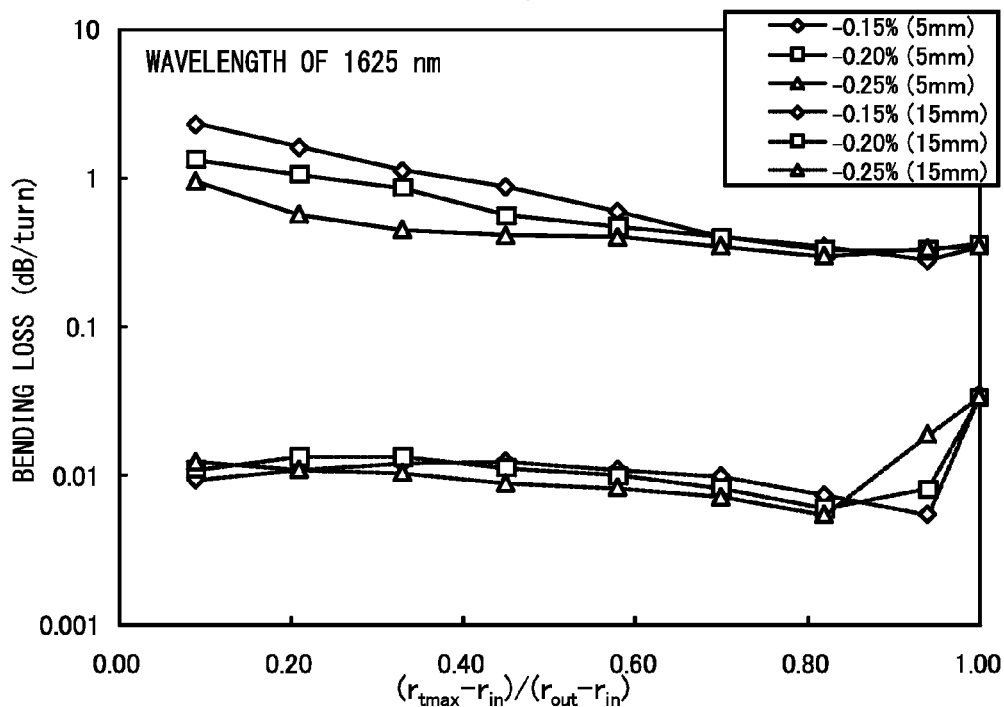
FIG. 20 is a graph on which bending losses in a wavelength of 1625 nm with respect to $(r_{tmax}-r_{in})/(r_{out}-r_{in})$ are plotted in Example 4.

The bending losses in a wavelength of 1550 nm at the bending radiuses of 5 mm and 15 mm is shown in FIG. 19, and the bending loss in a wavelength of 1625 nm at the same bending radius is shown in FIG. 20.

The solid line located at the upper portion of FIGS. 19 and 20 showed the bending loss at bending radius of 5 mm, and the broken line located at the lower portion showed the bending loss at bending radius of 15 mm.

Figure 21:
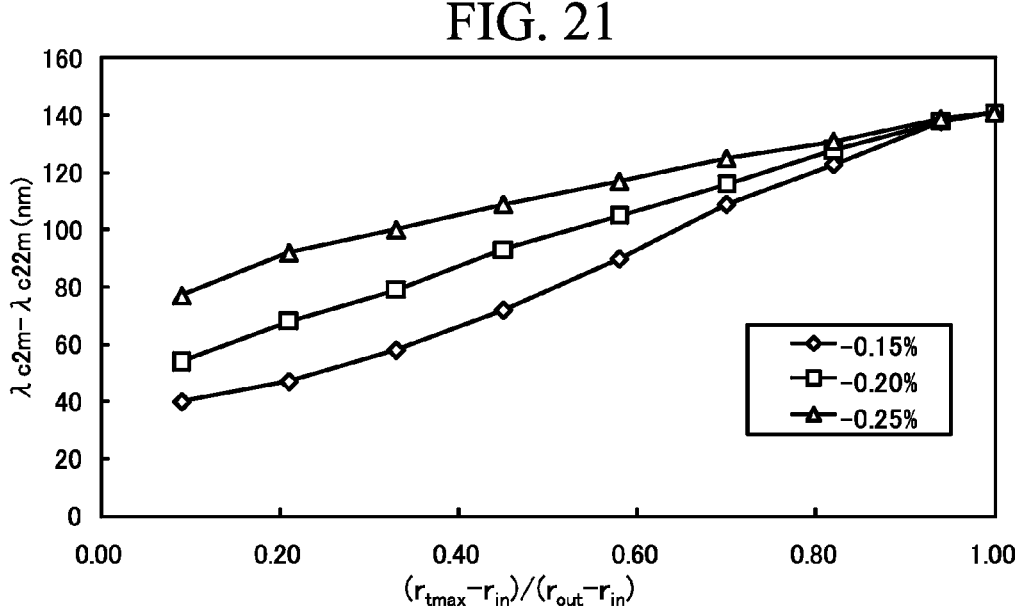
FIG. 21 is a graph on which $\lambda_{c2m}-\lambda_{c22m}$ with respect to $(r_{tmax}-r_{in})/(r_{out}-r_{in})$ are plotted in Example 4.
Figure 22:
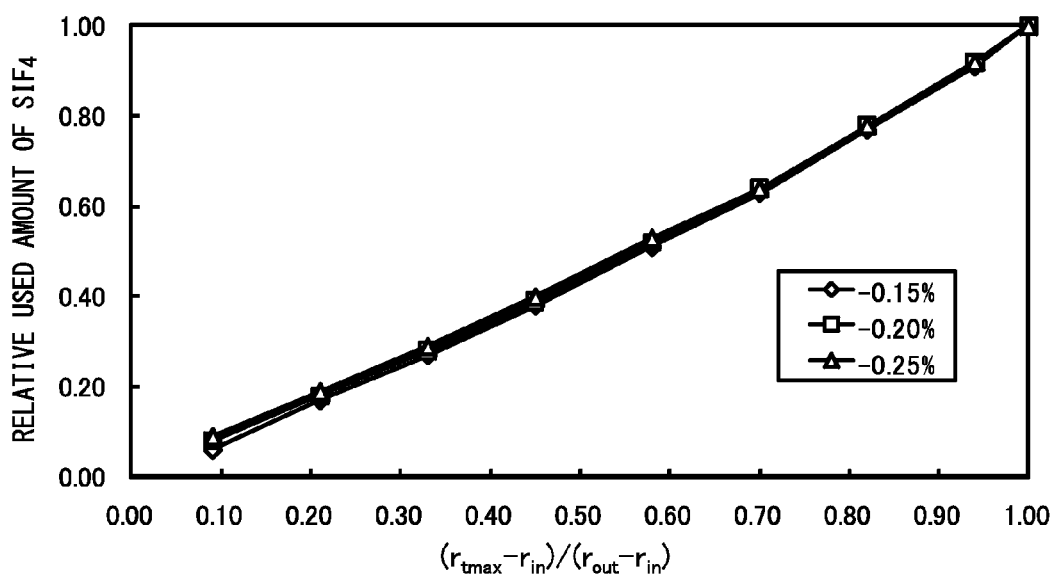
FIG. 22 is a graph on which the relative used amount of $SiF_4$ with respect to $(r_{tmax}-r_{in})/(r_{out}-r_{in})$ are plotted in Example 4.

Additionally, $\lambda_{c2m}-\lambda_{c22m}$ is shown in FIG. 21, and the relative used amount of $SiF_4$ is shown in FIG. 22.

In addition, the data in the case where $\Delta_{tmax}$ was −0.20% adopted in Example 2 are plotted in the FIGS. 19 to 22.

As shown in FIGS. 19 and 20, in the case where $(r_{tmax}-r_{in})/(r_{out}-r_{in})$ was range of 0.70 to 0.90 with respect to $-0.15\% \geq \Delta_{tmax} \geq -0.25\%$, it was possible to produce the optical fiber provided with a two-layer trench structure having the bending loss that was less than or equal to that of a conventionally-designed single layer trench structure.

As shown in FIGS. 21 and 22, when $(r_{tmax}-r_{in})/(r_{out}-r_{in})$ was 0.70, it was possible to shorten $\lambda_{c2m}-\lambda_{c22m}$ by approximately 15 to 30 nm as a conventionally-designed single layer trench structure, and it was possible to reduce the used amount of $SiF_4$ by approximately 35%.

Also, when $(r_{tmax}-r_{in})/(r_{out}-r_{in})$ was 0.90, it was possible to shorten $\lambda_{c2m}-\lambda_{c22m}$ by approximately 5 to 8 nm, and it was possible to reduce the used amount of $SiF_4$ by approximately 10%.

Example 5

A two-layer trench structure having $\Delta_{tmin}$ of −0.70% and $\Delta_{tmax}$ of −0.15% was designed under a condition in which the MFD becomes 8.6 μm at $\lambda_{c22m}$ of 1260 nm and a wavelength of 1310 nm.

The bending loss in the bending radiuses of wavelengths of 1550 nm and 1625 nm for each value $(r_{tmax}-r_{in})/(r_{out}-r_{in})$, the difference in $\lambda_{c2m}-\lambda_{c22m}$, and the relative used amount of $SiF_4$ are shown in Table 19.

When the two-layer trench structure and a conventional single layer trench structure were compared regarding bending loss, the bending loss at the bending radius of 5 mm of the two-layer trench structure was substantially the same as that of the bending loss of the conventional single layer trench structure under where $(r_{tmax}-r_{in})/(r_{out}-r_{in})$ was 0.45 to 0.94.

Furthermore, the bending loss at the bending radius of 15 mm of the two-layer trench structure was less than that of the bending loss of the conventional single layer trench structure.

When $(r_{tmax}-r_{in})/(r_{out}-r_{in})$ was 0.45, $\lambda_{c2m}-\lambda_{c22m}$ was shorter than that of the single layer trench structure by 66 nm, and it was possible to reduce the used amount of $SiF_4$ by 61%.

Example 6

Example 6 shows an example of a two-layer trench structure having $\Delta_{tmin}$ of −0.30% and $\Delta_{tmax}$ of −0.20% which were designed so as to have $\lambda_{c22m}$ and the MFD similar to Example 5.

The bending loss in the bending radiuses of wavelengths of 1550 nm and 1625 nm for each value $(r_{tmax}-r_{in})/(r_{out}-r_{in})$, the difference in $\lambda_{c2m}-\lambda_{c22m}$, and the relative used amount of $SiF_4$ are shown in Table 20.

TABLE 19

Calculated Result of Example 5

| | Bending Loss (dB/turn) | | | | | |
|---|---|---|---|---|---|---|
| | Wavelength of 1550 nm | | Wavelength of 1625 nm | | | Relative |
| $(r_{tmax}-r_{in})/(r_{out}-r_{in})$ | Bending Radius 5 mm | Bending Radius 15 mm | Bending Radius 5 mm | Bending Radius 15 mm | λc2m − λc22m (nm) | Used Amount of $SiF_4$ |
| 0.09 | 0.21 | 0.00002 | 0.40 | 0.00028 | 40 | 0.07 |
| 0.21 | 0.13 | 0.00002 | 0.23 | 0.00030 | 53 | 0.17 |
| 0.33 | 0.10 | 0.00002 | 0.17 | 0.00043 | 70 | 0.27 |
| 0.45 | 0.07 | 0.00002 | 0.11 | 0.00054 | 93 | 0.39 |
| 0.58 | 0.07 | 0.00013 | 0.11 | 0.00118 | 114 | 0.51 |
| 0.70 | 0.06 | 0.00022 | 0.09 | 0.00072 | 133 | 0.64 |
| 0.82 | 0.05 | 0.00019 | 0.10 | 0.00077 | 147 | 0.78 |
| 0.94 | 0.04 | 0.00073 | 0.11 | 0.00713 | 159 | 0.92 |
| 1.00 | 0.04 | 0.00625 | 0.10 | 0.01362 | 159 | 1.00 |

TABLE 20

Calculated Result of Example 6

| | Bending Loss (dB/turn) | | | | | |
|---|---|---|---|---|---|---|
| | Wavelength of 1550 nm | | Wavelength of 1625 nm | | | Relative Used |
| $(r_{tmax}-r_{in})/(r_{out}-r_{in})$ | Bending Radius 5 mm | Bending Radius 15 mm | Bending Radius 5 mm | Bending Radius 15 mm | $\lambda c2m - \lambda c22m$ (nm) | Amount of $SiF_4$ |
| 0.09 | 0.15 | 0.00002 | 0.29 | 0.00024 | 48 | 0.19 |
| 0.21 | 0.13 | 0.00002 | 0.24 | 0.00026 | 54 | 0.28 |
| 0.33 | 0.11 | 0.00002 | 0.21 | 0.00023 | 58 | 0.37 |
| 0.45 | 0.10 | 0.00002 | 0.19 | 0.00025 | 63 | 0.47 |
| 0.58 | 0.09 | 0.00001 | 0.16 | 0.00024 | 69 | 0.58 |
| 0.70 | 0.09 | 0.00002 | 0.15 | 0.00033 | 75 | 0.69 |
| 0.82 | 0.09 | 0.00003 | 0.15 | 0.00056 | 81 | 0.81 |
| 0.94 | 0.08 | 0.00003 | 0.13 | 0.00075 | 91 | 0.93 |
| 1.00 | 0.08 | 0.00006 | 0.13 | 0.00120 | 98 | 1.00 |

When the two-layer trench structure and a single layer trench structure were compared regarding bending loss, the bending loss at the bending radius of 5 mm of the two-layer trench structure was substantially the same as that of the bending loss of the single layer trench structure under where $(r_{tmax}-r_{in})/(r_{out}-r_{in})$ was 0.58 to 0.94.

Furthermore, the bending loss at the bending radius of 15 mm of the two-layer trench structure was less than that of the bending loss of the single layer trench structure.

When $(r_{tmax}-r_{in})/(r_{out}-r_{in})$ was 0.58, $\lambda_{c2m}-\lambda_{c22m}$ was shorter than that of the single layer trench structure by 29 nm, and it was possible to reduce the used amount of $SiF_4$ by 42%.

Example 7

A three-layer trench structure shown in FIG. 2 was designed under a condition in which the MFD becomes 8.9 μm at $\lambda_{c22m}$ of 1260 nm and a wavelength of 1310 nm.

Parameters and the values of Example 7 are shown in Table 21.

Moreover, in order for comparison with Example 7, by use of an example formed by $\lambda_{c22m}$ and the MFD similar to Example 7 as Comparative Example 2, the parameters of the conventional trench structure as shown in FIG. 6 are shown in Table 22.

TABLE 21

| Parameters of Example 7 | |
|---|---|
| $r_{in}/r_{core}$ | 2.25 |
| $r_{tmid}/r_{core}$ | 3.20 |
| $r_{tmax}/r_{core}$ | 3.60 |
| $r_{out}/r_{core}$ | 3.90 |
| $r_{out}$ | 15.63 μm |
| $\Delta_{core}$ | 0.3295% |
| $\Delta_{ic}$ | 0.00% |
| $\Delta_{t\,min}$ | −0.70% |
| $\Delta_{t\,mid}$ | −0.50% |
| $\Delta_{t\,max}$ | −0.15% |

TABLE 22

| Parameters of Comparative Example 2 | |
|---|---|
| $r_{in}/r_{core}$ | 2.25 |
| $r_{out}/r_{core}$ | 3.90 |
| $r_{out}$ | 14.5 μm |
| $\Delta_{core}$ | 0.297% |
| $\Delta_{ic}$ | 0.00% |
| $\Delta_t$ | −0.70% |

The bending loss in the bending radiuses of wavelengths of 1550 nm and 1625 nm, the difference in $\lambda_{c2m}-\lambda_{c22m}$, and the relative used amount of $SiF_4$ are shown in Table 23.

TABLE 23

Calculated Results of Example 7 and Comparative Example 2

| | Bending Loss (dB/turn) | | | | | |
|---|---|---|---|---|---|---|
| | Wavelength of 1550 nm | | Wavelength of 1625 nm | | | |
| | Bending Radius 5 mm | Bending Radius 15 mm | Bending Radius 5 mm | Bending Radius 15 mm | $\lambda c2m - \lambda c22m$ (nm) | Relative Used Amount of $SiF_4$ |
| Example 7 | 0.07 | 0.0004 | 0.16 | 0.0022 | 149 | 0.56 |
| Comparative Example 2 | 0.06 | 0.0049 | 0.10 | 0.0147 | 165 | 1.00 |

As compared with Comparative Example 2 that is a conventional trench structure, the bending loss of Example 7 was less than or equal to that of Comparative Example 2, $\lambda_{c2m}-\lambda_{c22m}$ becomes shortened by 17 nm, the used amount of $SiF_4$ can be reduced by 44%.

Example 8

A three-layer trench structure shown in FIG. 2 was designed under a condition in which the MFD becomes 8.9 µm at $\lambda_{c22m}$, of 1260 nm and a wavelength of 1310 nm.

Parameters and the values of Example 8 are shown in Table 24.

Moreover, in order for comparison with Example 8, by use of an example formed by $\lambda_{c22m}$ and the MFD similar to Example 8 as Comparative Example 3, the parameters of the conventional trench structure as shown in FIG. 6 are shown in Table 25.

TABLE 24

| Parameters of Example 8 | |
|---|---|
| $r_{in}/r_{core}$ | 2.25 |
| $r_{tmid}/r_{core}$ | 3.40 |
| $r_{tmax}/r_{core}$ | 3.60 |
| $r_{out}/r_{core}$ | 3.90 |
| $r_{out}$ | 16.21 µm |
| $\Delta_{core}$ | 0.3525% |
| $\Delta_{ic}$ | 0.00% |
| $\Delta_{t\,min}$ | −0.30% |
| $\Delta_{t\,mid}$ | −0.25% |
| $\Delta_{t\,max}$ | −0.20% |

TABLE 25

| Parameters of Comparative Example 3 | |
|---|---|
| $r_{in}/r_{core}$ | 2.25 |
| $r_{out}/r_{core}$ | 3.90 |
| $r_{out}$ | 16.07 µm |
| $\Delta_{core}$ | 0.349% |
| $\Delta_{ic}$ | 0.00% |
| $\Delta_{t}$ | −0.30% |

The bending loss in the bending radiuses of wavelengths of 1550 nm and 1625 nm, the difference in $\lambda_{c2m}-\lambda_{c22m}$, and the relative used amount of $SiF_4$ are shown in Table 26.

TABLE 26

| Calculated Results of Example 8 and Comparative Example 3 | | | | | |
|---|---|---|---|---|---|
| Bending Loss (dB/turn) | | | | | |
| Wavelength of 1550 nm | | Wavelength of 1625 nm | | | |
| Bending Radius 5 mm | Bending Radius 15 mm | Bending Radius 5 mm | Bending Radius 15 mm | λc2m − λc22m (nm) | Relative Used Amount of $SiF_4$ |
| Example 8 | 0.14 | 0.0005 | 0.20 | 0.0022 | 92 | 0.73 |
| Comparative Example 3 | 0.10 | 0.0005 | 0.15 | 0.0014 | 112 | 1.00 |

As compared with Comparative Example 3 that is a conventional trench structure, the bending loss of Example 8 was less than or equal to that of Comparative Example 3, $\lambda_{c2m}-\lambda_{c22m}$ becomes shortened by 20 nm, the used amount of $SiF_4$ can be reduced by 27%.

Example 9

A three-layer trench structure shown in FIG. 2 was designed under a condition in which the MFD becomes 8.6 µm at $\lambda_{c22m}$, of 1260 nm and a wavelength of 1310 nm.

Parameters and the values of Example 9 are shown in Table 27.

Moreover, in order for comparison with Example 9, by use of an example formed by $\lambda_{c22m}$ and the MFD similar to Example 9 as Comparative Example 4, the parameters of the conventional trench structure as shown in FIG. 6 are shown in Table 28.

TABLE 27

| Parameters of Example 9 | |
|---|---|
| $r_{in}/r_{core}$ | 2.25 |
| $r_{tmid}/r_{core}$ | 3.20 |
| $r_{tmax}/r_{core}$ | 3.40 |
| $r_{out}/r_{core}$ | 3.90 |
| $r_{out}$ | 15.49 µm |
| $\Delta_{core}$ | 0.366% |
| $\Delta_{ic}$ | 0.00% |
| $\Delta_{t\,min}$ | −0.70% |
| $\Delta_{t\,mid}$ | −0.50% |
| $\Delta_{t\,max}$ | −0.15% |

TABLE 28

| Parameters of Comparative Example 4 | |
|---|---|
| $r_{in}/r_{core}$ | 2.25 |
| $r_{out}/r_{core}$ | 3.90 |
| $r_{out}$ | 14.27 µm |
| $\Delta_{core}$ | 0.328% |
| $\Delta_{ic}$ | 0.00% |
| $\Delta_{t}$ | −0.70% |

The bending loss in the bending radiuses of wavelengths of 1550 nm and 1625 nm, the difference in $\lambda_{c2m}-\lambda_{c22m}$, and the relative used amount of $SiF_4$ are shown in Table 29.

TABLE 29

Calculated Results of Example 9 and Comparative Example 4

| | Bending Loss (dB/turn) | | | | | |
|---|---|---|---|---|---|---|
| | Wavelength of 1550 nm | | Wavelength of 1625 nm | | | |
| | Bending Radius 5 mm | Bending Radius 15 mm | Bending Radius 5 mm | Bending Radius 15 mm | λc2m − λc22m (nm) | Relative Used Amount of $SiF_4$ |
| Example 9 | 0.06 | 0.0002 | 0.10 | 0.0009 | 129 | 0.54 |
| Comparative Example 4 | 0.04 | 0.0062 | 0.10 | 0.0136 | 159 | 1.00 |

As compared with Comparative Example 4 that is a conventional trench structure, the bending loss of Example 9 was less than or equal to that of Comparative Example 4, $\lambda_{c2m} - \lambda_{c22m}$ became shortened by 30 nm, the used amount of $SiF_4$ was reduced by 46%.

Example 10

A three-layer trench structure shown in FIG. 2 was designed under a condition in which the MFD becomes 8.6 μm at $\lambda_{c22m}$, of 1260 nm and a wavelength of 1310 nm.

Parameters and the values of Example 10 are shown in Table 30.

Moreover, in order for comparison with Example 10, by use of an example formed by $\lambda_{c22m}$ and the MFD similar to Example 10 as Comparative Example 5, the parameters of the conventional trench structure as shown in FIG. 6 are shown in Table 31.

TABLE 30

Parameters of Example 10

| | |
|---|---|
| $r_{in}/r_{core}$ | 2.25 |
| $r_{tmid}/r_{core}$ | 3.20 |
| $r_{tmax}/r_{core}$ | 3.40 |
| $r_{out}/r_{core}$ | 3.90 |
| $r_{out}$ | 15.73 μm |
| $\Delta_{core}$ | 0.38% |
| $\Delta_{ic}$ | 0.00% |
| $\Delta_{t\,min}$ | −0.30% |
| $\Delta_{t\,mid}$ | −0.25% |
| $\Delta_{t\,max}$ | −0.20% |

TABLE 31

Parameters of Comparative Example 5

| | |
|---|---|
| $r_{in}/r_{core}$ | 2.25 |
| $r_{out}/r_{core}$ | 3.90 |
| $r_{out}$ | 15.61 μm |
| $\Delta_{core}$ | 0.376% |
| $\Delta_{ic}$ | 0.00% |
| $\Delta_t$ | −0.30% |

The bending loss in the bending radiuses of wavelengths of 1550 nm and 1625 nm, the difference in $\lambda_{c2m} - \lambda_{c22m}$, and the relative used amount of $SiF_4$ are shown in Table 32.

TABLE 32

Calculated Results of Example 10 and Comparative Example 5

| | Bending Loss (dB/turn) | | | | | |
|---|---|---|---|---|---|---|
| | Wavelength of 1550 nm | | Wavelength of 1625 nm | | | Relative |
| | Bending Radius 5 mm | Bending Radius 15 mm | Bending Radius 5 mm | Bending Radius 15 mm | λc2m − λc22m (nm) | Used Amount of $SiF_4$ |
| Example 10 | 0.09 | 0.00002 | 0.16 | 0.00028 | 72 | 0.61 |
| Comparative Example 5 | 0.08 | 0.00006 | 0.13 | 0.00120 | 98 | 1.00 |

As compared with Comparative Example 5 that is a conventional trench structure, the bending loss of Example 10 was less than or equal to that of Comparative Example 5, $\lambda_{c2m} - \lambda_{c22m}$ became shortened by 26 nm, the used amount of $SiF_4$ was reduced by 39%.

In other cases, the technical scope of the invention is not limited to the above embodiments, but various modifications may be made without departing from the scope of the invention.

What is claimed is:

1. An optical fiber, comprising:
   a core provided at a central portion;
   an internal cladding coat provided around the core, having a refractive index less than a refractive index of the core;
   a trench coating provided at a periphery of the internal cladding coat and constituted of two or more layers having different refractive indices; and
   an outermost cladding coat provided at a periphery of the trench coating, wherein
   a layer having the highest refractive index in the trench coating configures an outermost layer of the trench coating, $\Delta_{core} > \Delta_{ic} > \Delta_{tmax} > \Delta_{tmin}$, $-0.15\% \geq \Delta_{tmax} > \Delta_{tmin} \geq -0.7\%$, and $0.45 \leq (r_{tmax} - r_{in})/(r_{out} - r_{in}) \leq 0.9$ are satisfied where a relative refractive index difference of the core is represented as $\Delta_{core}$, a relative refractive index difference of the internal cladding coat is represented as $\Delta_{ic}$, a relative refractive index difference of a layer having the highest refractive index in the trench coating is represented as $\Delta_{tmax}$, a relative refractive index difference of a layer having the lowest refractive index in the trench coating is represented as $\Delta_{tmin}$, a radius of an internal edge of the trench coating is represented as $r_{in}$, a radius of an external edge of the trench coating is represented as $r_{out}$, and a radius of an internal edge of a layer having the highest refractive index in the trench coating is represented as $r_{tmax}$ and where the relative refractive index differences are based on a refractive index of the outermost cladding coat.

2. The optical fiber according to claim 1, wherein relationships $-0.40\% \geq \Delta_{tmin} \geq -0.50\%$ and $-0.15\% \geq \Delta_{tmax} \geq -0.25\%$ are satisfied in the trench coating.

3. The optical fiber according to claim 1, wherein relationship $0.7 \leq (r_{tmax} - r_{in})/(r_{out} - r_{in}) \leq 0.9$ is satisfied in the trench coating.

4. The optical fiber according to claim 1, wherein relationship $0.7 \leq (r_{tmax} - r_{in})/(r_{out} - r_{in}) \leq 0.8$ is satisfied in the trench coating.

5. The optical fiber according to claim 1, wherein the layer having the lowest refractive index in the trench coating configures an innermost layer of the trench coating.

6. The optical fiber according to claim 1, wherein the outermost cladding coat is formed of pure silica glass and the trench coating is formed of silica glass into which fluorine is introduced.

* * * * *